US007260653B2

(12) United States Patent
Le Scolan et al.

(10) Patent No.: US 7,260,653 B2
(45) Date of Patent: Aug. 21, 2007

(54) METHOD AND DEVICE FOR THE SYNCHRONIZATION BETWEEN TWO NETWORKS

(75) Inventors: Lionel Le Scolan, Rennes (FR); Mohamed Braneci, Rennes (FR); Patrice Nezou, Bruz (FR); Pascal Rousseau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 11/154,680

(22) Filed: Jun. 17, 2005

(65) Prior Publication Data

US 2005/0237928 A1 Oct. 27, 2005

Related U.S. Application Data

(63) Continuation of application No. 09/566,088, filed on May 9, 2000, now Pat. No. 7,058,729.

(30) Foreign Application Priority Data

May 11, 1999 (FR) ................................. 99 06029
May 11, 1999 (FR) ................................. 99 06030

(51) Int. Cl.
*G06F 15/16* (2006.01)

(52) U.S. Cl. ...................... 709/248; 709/220; 709/223; 709/236; 370/395.62; 713/375; 713/400; 714/731; 714/744; 714/775; 714/789; 714/814; 714/819

(58) Field of Classification Search ................ 709/248; 713/375, 400; 714/731, 744, 775, 789, 819, 714/814; 370/395.62
See application file for complete search history.

(56) References Cited

U.S. PATENT DOCUMENTS 4,009,347 A 2/1977 Flemming et al. .......... 370/321

4,144,414 A 3/1979 Nicholas ..................... 370/507
4,325,090 A 4/1982 Janak et al. ................. 360/51

(Continued)

FOREIGN PATENT DOCUMENTS

EP 841767 5/1998

OTHER PUBLICATIONS

"P139.4 Draft Standard for High Performance Serial Bus Bridges", Feb. 7, 1999, The Institute of Electrical And Electronics Engineers, Inc., pp. 1-34.

*Primary Examiner*—Michael Won
(74) *Attorney, Agent, or Firm*—Fitzpatrick, Cella, Harper & Scinto

(57) ABSTRACT

The present invention relates to a method of synchronization between communication networks exchanging information by frame of informations, each communication network having clock and the number of clock pulses is monitored by a counter the synchronization is made by reading information representing the counted clock pulses of the clock of the first network at the appearance of a reference event, inserting at least said information or calculated information on the basis of said information into the frame of information as the synchronization information, transferring said frame of information from the first to the second network, reading information representing the number of counted clock pulse of the clock of the second network at the appearance of reference event, reading synchronization information inserted in received frame of information from the first network, calculating a difference between information and synchronizing the second network.

9 Claims, 18 Drawing Sheets

| Reference times (A) | $tA$ | $tA'$ | $tA''$ | $tA^{(3)}$ | $tA^{(4)}$ | $tA^{(5)}$ | $tA^{(6)}$ | $tA^{(7)}$ | ... |
|---|---|---|---|---|---|---|---|---|---|
| Reference times (B) | $tB$ | $tB'$ | $tB''$ | $tB^{(3)}$ | $tB^{(4)}$ | $tB^{(5)}$ | $tB^{(6)}$ | $tB^{(7)}$ | ... |
| Reference periods | ←→←→ | | ←→←→ | | ←→←→ | | | ←→←→ | |

U.S. PATENT DOCUMENTS

| | | | |
|---|---|---|---|
| 4,531,185 A * | 7/1985 | Halpern et al. | 713/375 |
| 4,584,643 A * | 4/1986 | Halpern et al. | 709/248 |
| 4,592,050 A | 5/1986 | Bensadon | 370/103 |
| 4,815,110 A | 3/1989 | Benson et al. | 375/356 |
| 4,816,989 A * | 3/1989 | Finn et al. | 709/248 |
| 4,890,222 A | 12/1989 | Kirk | 713/400 |
| 5,041,966 A * | 8/1991 | Nakai et al. | 713/375 |
| 5,408,506 A | 4/1995 | Mincher et al. | 375/134 |
| 5,428,645 A | 6/1995 | Dolev et al. | 375/354 |
| 5,499,275 A | 3/1996 | Kishi | 375/357 |
| 5,535,217 A * | 7/1996 | Cheung et al. | 709/248 |
| 5,566,180 A | 10/1996 | Eidson et al. | 370/473 |
| 5,638,379 A | 6/1997 | Narasimha et al. | 714/707 |
| 5,689,688 A | 11/1997 | Strong et al. | 713/375 |
| 5,907,685 A * | 5/1999 | Douceur | 709/248 |
| 5,944,834 A * | 8/1999 | Hathaway | 713/500 |
| 5,982,828 A * | 11/1999 | Fujimori et al. | 375/356 |
| 6,128,318 A * | 10/2000 | Sato | 370/503 |
| 6,157,646 A | 12/2000 | Nichols | 370/395.62 |
| 6,157,957 A | 12/2000 | Berthaud | 709/248 |
| 6,199,169 B1 * | 3/2001 | Voth | 713/400 |
| 6,327,273 B1 | 12/2001 | Van der Putten et al. | 370/503 |
| 6,343,096 B1 | 1/2002 | Davidsson et al. | 375/224 |
| 6,415,325 B1 * | 7/2002 | Morrien | 709/230 |
| 6,574,245 B1 | 6/2003 | Bedrosian | 370/503 |
| 6,714,611 B1 | 3/2004 | Du et al. | 375/356 |
| 6,763,474 B1 * | 7/2004 | Boerstler et al. | 713/400 |
| 6,801,951 B1 * | 10/2004 | Roden, III | 709/248 |

* cited by examiner

| Reference times (A) | tA | tA' | tA" | ~~tA(3)~~ | tA(4) | ~~tA(5)~~ | ~~tA(6)~~ | tA(7) | ... |
|---|---|---|---|---|---|---|---|---|---|
| Reference times (B) | tB | tB' | tB" | tB(3) | tB(4) | ~~tB(5)~~ | tB(6) | tB(7) | ... |
| Reference periods | ↕ | ↕ | ↕ | ↕ | ↕ | ↕ | ↕ | ↕ | |

Figure 7

METHOD AND DEVICE FOR THE SYNCHRONIZATION BETWEEN TWO NETWORKS

This application is a continuation of application Ser. No. 09/566,088, filed on May 9, 2000 now U.S. Pat. No. 7,058,729.

BACKGROUND OF THE INVENTION

1. Field of the Invention

The present invention concerns a method for synchronization between two networks.

2. Description of the Related Art

Communication networks are known, formed by several serial communication buses which are for example in accordance with IEEE 1394-1995.

IEEE 1394-1995 defines a high-throughput serial communication bus which must allow a low-cost interconnection between cards in the same item of equipment, cards in different equipments and external peripheries.

There are two physical environments for a serial bus: the cable and the back plane (or interconnection card). Interconnection by cable makes possible to connect up to sixteen different items of equipment at a maximum distance of 4.5 meters. This allows a total distance of 72 meters between the furthest-away items of equipment. The speed of transmission over the cable can be 100, 200 or even 400 Mbps. The transmission speeds on a back plane can be 25 (24,576) and 50 Mbps. The access mechanism to the bus has been specified in this standard to allow equitable use of the bus by all the items of equipment connected thereto. In addition to the conventional functions of reading/writing, the serial bus offers advanced synchronized services such as the transportation of isochronous data (guaranteeing a transmission time and a bandwidth), and are overall time base with a precision less than one microsecond for synchronizing data and events.

The serial communication buses are organized in a network, that is to say they are connected together by interconnection elements which are referred to as "bridges".

The bridges connecting serial communication buses are in particular the subject of the standard P1394.1, which is under discussion.

A bridge has two items of interconnection equipment or nodes, also referred to as "portals", which are each connected to one of the two serial communication buses.

These two items of interconnection equipment communicate with each other through links of different natures: wired, optical, radio etc.

The bus network thus forms a structure arranged hierarchically in a tree in which one of the buses is considered to be the upper bus, referred to as the "root" bus, from which the various other buses extend, constituting the branches of the hierarchical tree structure.

Each serial communication bus in such network connects together different peripherals such as printers, computers, servers, scanners, video tape recorders, decoders (or set top boxes), television receivers, digital cameras, camcorders, digital photographic apparatus, telephones, audio/video players, etc.

These peripherals are generally referred to as nodes.

On each serial communication bus in the network, each peripheral or node has an internal clock (oscillator) from which clock pulses are generated at a clock frequency, for example 24.576 MHz.

On each serial communication bus in a network, one of the nodes is referred to as the "Cycle Master", and the cycle master node on the "root" bus is referred to as the "Network cycle master".

All "cycle master" nodes in the network generate cycles using their internal clocks and thus the duration of these cycles will depend on the precision of each particular clock. The duration of the cycle denoted T, peculiar to a bus, is equal to an integer number $n_{init}$ of clock pulses common or not to all the buses and which is multiplied by the inverse of the frequency of the internal clock of the "cycle master" node of the bus.

The duration of the isochronous cycle T is thus for example 125 microseconds±12,5 ns.

The synchronization of the isochronous cycles on a serial communication bus is checked by the "cycle master" node of the bus under consideration, which can be defined as a synchronization node of the bus.

The "cycle master" node will then generate, on the bus, every 125 microseconds±12,5 ns, a signal referred to as the "cycle start packet", which corresponds to a synchronization message. The frequency of generation of this signal is supplied by an internal clock, derived from its local clock at 24.576 MHz, with a frequency equal to 8 kHz±100 ppm that the "cycle master" node keeps up to date.

This signal on the bus, makes it possible to synchronize other nodes with respect to the "cycle master" node and also inform them that they can transmit isochronous data to other nodes on the same bus or one or more of the other buses, which are connected to the bus under consideration respectively by one or more bridges.

It should be noted that, when an isochronous cycle starts, whilst the data are being transmitted over the bus, the generation of the cycle start packet is delayed, that's generates a significant shift of the cycle start.

Considering that such a shift is very often unacceptable, the delay time on transmission of a cycle start signal is taken into account in a register referred to as the cycle time register. Thus, the Cycle Master makes through the cycle starts signal, a copy of its cycle time register for all isochronous nodes connected to the bus.

Each node which is capable of transmitting isochronous data has such cycle time register.

The cycle time register, also abbreviated to CTR, has a size of 32 bits, the first twelve bits represent a counter modulo 3072 which is incremented at each period of the local clock which frequency is 24.576 MHz.

The following thirteen bits of the cycle time register CTR represents a counter of the number of isochronous cycles transmitted at a frequency of 8 kHz.

The last seven bits of the cycle time register CTR count the number of seconds.

When the cycle start signal reaches all the nodes on the bus able to transmit isochronous data, they copy, into a register, the content of the cycle time register CTR of the "cycle master" node of the bus contained in the cycle start signal.

The maximum difference is in fact obtained when the internal clock frequency of one of the peripherals is 24.576 MHz+100 ppm and the other frequency of the other peripheral is 24.576 MHz−100 ppm.

For example, the frequency of the internal clock of the "network cycle master", denoted $CM_A$, of the "root" bus has a value of 24.576 MHz+100 ppm, whilst that of the internal clock the "cycle master" $CM_B$, of a lower-level bus which is directly connected to the "root" bus by a bridge has a value of 24.576 MHz-100 ppm.

The communication networks formed by serial communication buses allow the transmission of synchronized data using cycles of the buses under consideration. The buses are for example used for transmitting real-time data of the audio/video type.

Thus, when the two "cycle masters" previously mentioned, denoted $CM_A$ and $CM_B$, are taken with their respective clock frequency values, namely 24.576 MHz+100 ppm and 24.576 MHz−100 ppm, the duration of the cycles calculated for each of the "cycle masters", denoted respectively $T_A$ and $T_B$, are different, because of the different frequencies of the internal clocks of these "cycle masters".

FIG. 1 also illustrates this phenomenon and shows, on two superimposed axes, for the same integer number $n_{init}$ such that $T_A$ $A=n_{init}/F_A$ and $T_B=n_{init}/F_B$, where F designates the clock frequency of the "cycle master" under consideration, a cycle of duration $T_B$ greater than the cycle $T_A$.

This figure depicts, above the first two cycles of the bus, the numbers of two data packets identified by the numbers 1 and 2.

It should also be noted that the case depicted in FIG. 1 is very unlikely in reality since it envisages a nil phase difference at the origin of each of the first cycles of the two buses.

However, a comparison of these two axes shows a relative shift in the start of each cycle which corresponds in fact to a change in the phase shift (nil at the origin of the times in the figure) in the course of time between the cycles under consideration.

In addition, two arrows have been depicted between the two axes in order to indicate the delay with which the data packets denoted 1 and 2 are transmitted over the bus B after having crossed the bridge connecting buses A and B together. It is in fact estimated that the delay depicted here is equivalent to two cycles and is explained by the time necessary for the processing of the packets in the bridge before they are transmitted over the bus B.

Thus, having regard to the relative time offset noted between the respective cycles of buses A and B, at the end of a certain number of cycles, a data packet emanating from bus A will not be transmitted to bus B.

The non-transmission of this data packet may therefore be highly prejudicial for real-time data of the audio and/or video type.

This is because, with data for example of the video type, it is very important to correctly transmit all the video data packets so as not to degrade the video image obtained from the transmitted packets.

In general terms, if the duration $T_A$ is less than $T_B$, then a data packet will be lost at the end of a certain number of cycles, which means that one cycle will have been lost, and if, on the other hand, $T_A$ is greater than $T_B$, then no data packet will be transmitted during one of the cycles and there will therefore be an empty cycle, giving rise, thereby, to a loss of synchronization in the processing of real-time data of the audio and/or video type.

The problem of offset mentioned above is currently being studied within the Bridge working group of the IEEE 1394 (standard P1394.1) standardization committee.

Solutions have been proposed, notably by the Philips company in January and March 1998 within this working group, in the form of two contributions referenced Br008r00.pdf and Br015r00.pdf entitled: "Synchronizing Cycle Master to External Timing Information via Cycle Slave".

In the context of this solution, a bridge consisting of two connecting nodes or "portals" connect two serial communication buses, one being referred to as the master bus and the other the slave bus respectively referenced $b_A$ and $b_B$. In a known fashion, the isochronous cycles of each serial communication bus $b_A$ and $b_B$ are synchronized by virtue of the mechanism for transmitting the cycle start signals generated by the "cycle master" synchronization nodes of each of the buses. In order to solve the problem mentioned above and to synchronize buses $b_A$ and $b_B$ together, Philips proposes to transmit, at the connecting node connected to the bus $b_A$, a signal referred to as "cycle reset" intended for the interconnecting node connected to the bus $b_B$.

This signal indicates the start of a new isochronous cycle which corresponds to the change to zero of the first twelve bits of the cycle time register CTR at the interconnecting node connected to the bus $b_A$. These first twelve bits are referred to as "cycle offset".

The interconnecting node connected to the bus $b_B$ receiving the "cycle reset" signal recovers the value of the counter "cycle offset" from its cycle time register CTR and stores it in a register called "timer offset".

The register "timer offset" therefore contains the value of the offset between the isochronous cycles of the master bus $b_A$ and slave bus $b_B$.

Next, the interconnecting node connected to the bus $b_B$, copies the content of the register "timer offset" into a register called "timer adjustment" of the "cycle master" node of the slave bus $b_B$.

The "cycle master" node of the slave bus b. then reads the content of its cycle time register CTR, subtracts therefrom the value of the content of the register "timer adjustment" and records this result in its cycle time register CTR.

This method makes it possible to keep the registers "cycle offset" of the "cycle master" nodes of buses $b_A$ and be synchronized at each transmission of the isochronous cycle, which prevents offsets due to lack of precision in their respective clocks.

However, this solution has a drawback since the transmission of the signal "cycle reset" from the interconnecting node connected to the bus $b_A$ to the interconnecting node connected to the bus $b_A$ must be instantaneous or of relatively short duration known with precision in order not to introduce any error into the evaluation of the start of the isochronous cycle.

This solution is applicable when the two interconnecting nodes of the bridge form part of the same physical entity or are not distant from each other.

However, when these two items of interconnecting equipment communicate with each other for example by radio, by optical link or through a network the transmission of the signal "cycle reset" is not instantaneous and suffers various transmission delays.

In addition, in the case of transmission by radio, it is not possible to guarantee good reception of the signal because of interference on the radio channel.

Consequently, it would be advantageous to find a method for synchronizing two serial communication buses connected together by a bridge, whatever the communication medium used for the transmission of information between the two interconnection nodes constituting the bridge.

In general terms, this invention solves the problem of synchronization between the two synchronization nodes or "cycle masters" of the serial communication buses under consideration.

SUMMARY OF THE INVENTION

The present invention thus aims to remedy this problem by proposing a method of synchronization between communication networks exchanging information by frame of informations, each communication network having clock and the number of clock pulses is monitored by a counter, the method comprises the following steps:

reading information representing the counted clock pulses of the clock of the first network at the appearance of a reference event, inserting at least said information or calculated information on the basis of said information into the frame of information as the synchronization information, transferring said frame of information from the first to the second network, reading information representing the number of counted clock pulse of the clock of the second network at the appearance of reference event, reading synchronization information inserted in received frame of information from the first network, calculating a difference between information, synchronizing the second network.

Correlatively, the invention proposes an apparatus for synchronization between communication networks exchanging information by frame of informations, each communication network having clock and the number of clock pulses is monitored by a counter, the apparatus connected to at least two networks comprising:

reading means for reading information representing the counted clock pulses of the clock of the first network at the appearance of a reference event, inserting means for inserting at least said information or calculated information on the basis of said information into the frame of information as the synchronization information, transferring means for transferring said frame of information from the first to the second network, reading means for reading information representing the number of counted clock pulse of the clock of the second network at the appearance of reference event, reading means for reading synchronization information inserted in received frame of information, calculating means for calculating a difference between information, synchronizing means for synchronizing the second network.

By this way, no packets are lost, which is important for the transfer of certain data, no large memory used for buffering data is required if networks are not synchronized. By taking the number of counted clock pulses of two networks, we can easily synchronize one network to the second. The reference event permit to keep track of the moment these numbers have been taken avoiding problem generated by delay of transmission and processing time. A difference calculation is also an easy way to evaluate unsynchronizations between two networks. The insertion of synchronization informations into data frames does need to generate special synchronization signals among network and simplifies the configuration of interconnected networks. The processing time mentioned above, which represents the time to recover the synchronization information into the data frame has no effect on the accuracy of the synchronization of the networks.

The invention also proposes a method of transferring information from a first node to a second node, each node connected respectively to a communication network, each communication network being synchronized by exchanging a synchronization information between the first and the second node, the first node having a counter monitoring clock pulses of a clock, the method comprises the following steps executed in the first node when a frame comprising data has to be transferred from the first node to the second:

reading information representing the counted clock pulses at the appearance of a reference event, inserting at least said information or calculated information on the basis of said information into the frame as the synchronization information, transferring said frame to the second node.

It also proposes an apparatus for transferring information to a node of communication, the apparatus and the node connected respectively to a communication network, each communication network being synchronized by exchanging synchronization information between the apparatus and the node, the apparatus having a counter monitoring clock pulses of a clock, the apparatus comprising the following means:

reading means for reading information representing the counted clock pulses at the appearance of a reference event, inserting means for inserting at least said information or calculated information on the basis of said information into a frame as the synchronization information, transferring means for transferring said frame to the node.

This invention also proposes a method of receiving information from a first node by a second node, each node connected respectively to a communication network, each communication network being synchronized by exchanging a synchronization information between the first and the second nodes, the second node having a counter monitoring clock pulses of a clock, the method comprises the following steps executed in the second node when a frame comprising data is received from a first node:

reading information representing the counted clock pulse at the appearance of reference event, reading synchronization information inserted in received frame, calculating a difference between information, entering into a network synchronization procedure according to the results of the calculating step.

Correlatively, the invention also proposes an apparatus for receiving information from a node, the node and the apparatus connected respectively to a communication network, each communication network being synchronized by exchanging a synchronization information between the node and the apparatus, the apparatus having a counter monitoring clock pulses of a clock, the apparatus comprising:

reading means for reading information representing the counted clock pulse at the appearance of reference event, reading means for reading synchronization information inserted in received frame, calculating means for calculating a difference between information, synchronization means for synchronizing the network according to the results of the calculating means.

According to a preferred embodiment, the calculated information inserted into the frame is a difference of the number of counted clock pulses between two reference events.

By such way, we can reduce the quantity of informations inserted into a frame, so the effective bandwidth for data transmission is maintained in a certain manner. Stable propagation delays have no effect on the invention, so the total accuracy of the synchronization is improved.

According to another preferred embodiment, the frame is constituted of a preamble, and a data frame and the reference event is the start of the data frame.

By such way, no additional signal, recognized as reference event need to be generated on the network, so the effective bandwidth for data transmission is not decreased. The start of data frame is already recovered by normal transmitter or receiver, no big modifications need to be done on such devices, it contributes to provide simple and cheap transceivers. The start of frame for transmitted frame and received frame are considered as the same reference event, as the invention is not sensible to propagation delays.

The invention moreover considers an information storage means, possibly completely or partially removable, which can be read by a computer or a processor containing instructions of a computer program, characterized in that it allows either the implementation of synchronization method or method of transferring or receiving information as briefly set out above.

The invention further considers an information storage means, possibly completely or partially removable, which can be read by a computer or a processor containing either data for the implementation of synchronization method or method of transferring or receiving information as briefly set out above.

The invention also considers a computer program product loadable into a programmable device, comprising software code portions for performing the steps of the methods as briefly set out above, when said product is run on a programmable device.

The invention also concerns a memory medium for storing a program to be executed in an apparatus for transferring information to a node of communication, the apparatus and the node connected respectively to a communication network, each communication network being synchronized by exchanging a synchronization information between the apparatus and the node, the apparatus having a counter monitoring clock pulses of a clock, the program comprising:
  code for reading information representing the counted clock pulses at the appearance of a reference event,
  code for inserting at least said information or calculated information on the basis of said information into a frame as the synchronization information,
  code for transferring said frame to the node.

The invention is also related to a memory medium for storing a program to be executed in an apparatus for receiving information from a node, the node and the apparatus connected respectively to a communication network, each communication network being synchronized by exchanging a synchronization information between the node and the apparatus, the apparatus having a counter monitoring clock pulses of a clock, the program comprising:
  code for reading information representing the counted clock pulse at the appearance of reference event,
  code for reading synchronization information inserted in received frame,
  code for calculating a difference between information,
  code for synchronizing the network according to the results of the calculating means.

Correlatively, the invention concerns a program stored in a memory medium in an apparatus for transferring information to a node of communication, the apparatus and the node connected respectively to a communication network, each communication network being synchronized by exchanging a synchronization information between the apparatus and the node, the apparatus having a counter monitoring clock pulses of a clock, comprising:
  code for reading information representing the counted clock pulses at the appearance of a reference event,
  code for inserting at least said information or calculated information on the basis of said information into a frame as the synchronization information,
  code for transferring said frame to the node.

The invention also concerns a program stored in a memory medium in an apparatus for receiving information from a node, the node and the apparatus connected respectively to a communication network, each communication network being synchronized by exchanging a synchronization information between the node and the apparatus, the apparatus having a counter monitoring clock pulses of a clock, comprising:
  code for reading information representing the counted clock pulse at the appearance of reference event,
  code for reading synchronization information inserted in received frame,
  code for calculating a difference between information,
  code for synchronizing the network according to the results of the calculating means.

Correlatively, the invention is relating to an apparatus for transferring information to a node of communication, the apparatus and the node connected respectively to a communication network, each communication network being synchronized by exchanging a synchronization information between the apparatus and the node, the apparatus having a counter monitoring clock pulses of a clock, the apparatus comprising:
  a processor for reading information representing the counted clock pulses at the appearance of a reference event,
  and for inserting at least said information or calculated information on the basis of said information into a frame as the synchronization information,
  transferring means for transferring said frame to the node.

Correlatively, the invention is related to an apparatus for receiving information from a node, the node and the apparatus connected respectively to a communication network, each communication network being synchronized by exchanging a synchronization information between the node and the apparatus, the apparatus having a counter monitoring clock pulses of a clock, the apparatus comprising:
  a processor for reading information representing the counted clock pulse at the appearance of reference event,
  and for reading synchronization information inserted in received frame,
  and for calculating a difference between information,
  synchronization means for synchronizing the network according to the results of the calculating means.

On an other aspect, the invention concerns a method of transferring information from a first node to a second node, each node connected respectively to a communication network, each communication network being synchronized by exchanging a synchronization information between the first and the second node, the first node having a counter monitoring clock pulses of a clock, the method comprises the following steps executed in the first node when a frame comprising data has to be sent from the first node to the second
  obtaining information representing time in a communication network at a reference event,
  sending said frame with said information representing time.

On another aspect, the invention also concerns a method of transferring information from a first node to a second node, each node connected respectively to a communication network, each communication network being synchronized by exchanging a synchronization information between the first and the second node, the first node having a counter monitoring clock pulses of a clock, the method comprises the following steps executed in the first node when a frame comprising data has to be sent from the first node to the second obtaining information representing a duration between the reference event of at least two frames, sending said frame with said information representing a duration.

Other characteristics and advantages will emerge during the following description, given solely by way of non-limitative example and made with reference to the accompanying drawings.

BRIEF DESCRIPTION OF THE DRAWINGS

FIG. 7 is a table representing the different reference times at the interconnection nodes A and B depicted in FIGS. 3 and 4, and the corresponding reference periods.

DETAILED DESCRIPTION OF THE PREFERRED EMBODIMENTS

The invention is particularly effective in networks consisting of serial communication buses in accordance with IEEE 1394 standard.

The invention makes it possible for example to interconnect two serial communication buses in accordance with IEEE 1394 standard through a radio bridge.

IEEE 1394 standard defines a rapid serial connection which makes it possible to connect, to a bus in accordance with this standard, up to sixteen nodes or stations, and makes it possible to convey asynchronous and isochronous traffic over the bus.

The bit rate which is specified by this standard is greater than or equal to 98.304 Mbit/s.

Transmission of isochronous traffic over a 1394 serial communication bus is based on a network clock of 8 kHz which defines cycles with a duration of 125 µs±12.5 ns during which each node or peripheral connected to the bus can send isochronous data over the bus.

Amongst all the nodes connected to the bus, one of them is considered to be a reference for all the others and is referred to as the "cycle master".

This synchronization node denoted CM synchronizes all the clocks of the other nodes with respect to its own clock.

In a communication network consisting of two or more serial communication buses in accordance with IEEE 1394 standard, when several buses are connected together by means of bridges, one of the synchronization nodes CM amongst all the synchronization nodes of all the buses is chosen as a reference for the entire network.

This means that the clock of the reference node referred to as the "network cycle master" constitutes a reference clock for the entire network, the clocks of the synchronization nodes of the other buses in the network then having to synchronize themselves with respect to the clock thereof.

Figure 1:
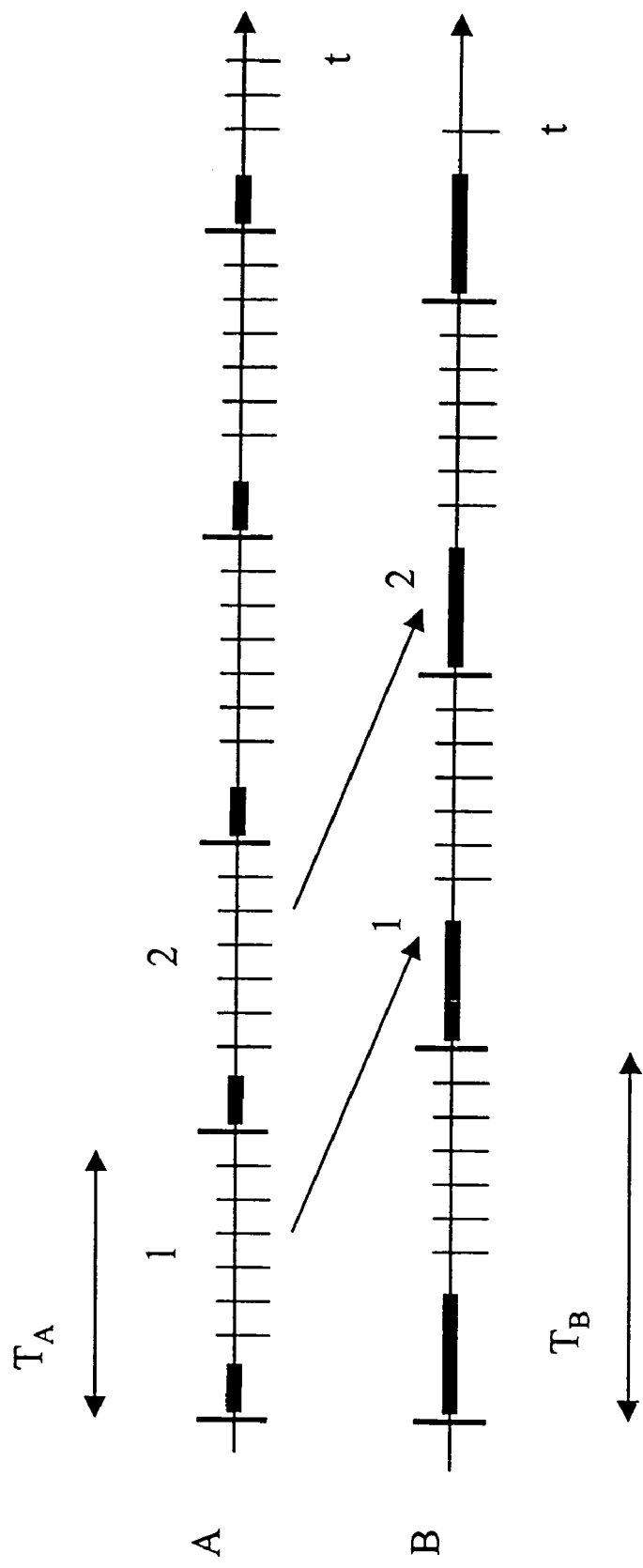
FIG. 1 is a diagram illustrating the mechanism of the offset between two clocks of two communication nodes A and B.
Figure 2:
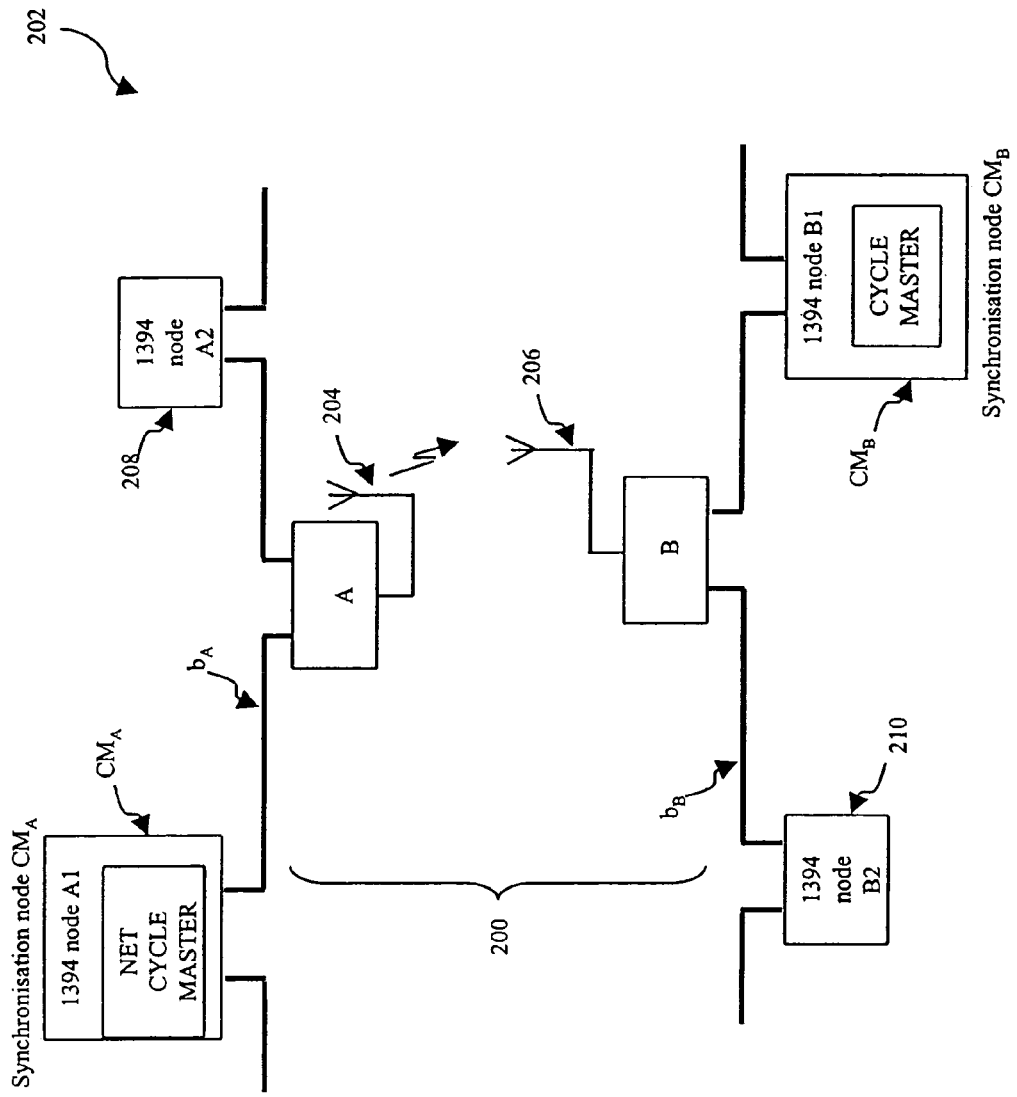
FIG. 2 is a schematic view of a communication network according to a first aspect of the invention, including two serial communication buses connected together by a radio bridge where synchronization nodes are different from the radio bridge.

For a better understanding of the invention, the interconnection of two serial communication buses in accordance with IEEE 1394 standard and denoted $b_A$ and $b_B$ in FIG. 2 by means of two interconnection nodes denoted A and B, connected together by a radio link, will be considered.

When the interconnection nodes A and B are located at a distance from each other, they can, for example, represent two different data processing devices chosen from amongst the following devices: printer, server, computer, facsimile machine, scanner, video tape recorder, decoder (or set top box), television receiver, telephone, audio/video player, camcorder, digital camera or digital photographic apparatus.

It should be noted that nodes A and B could, as an alternative, be connected together by an optical, cable, etc link.

According to the type of link, they are not necessarily placed at a distance from each other and can on the contrary constitute a single physical entity.

These interconnection nodes or items of equipment form a radio bridge denoted 200 and interconnect the two buses $b_A$ and $b_B$ which form a communication network or a part of a communication network according to the invention denoted 202 (FIG. 2).

These interconnection nodes are, within the meaning of IEEE P 1394.1 standard, "portals".

The bridge 200 provides the interface between the buses $b_A$ and $b_B$, and the nodes A and B communicate with each other by means of respective radio antennae 204, 206.

The bus $b_A$ is considered to be the "master" bus, whilst the bus $b_B$ is considered to be the "slave" bus.

As depicted in FIG. 2, several nodes are connected to the different buses $b_A$, $b_B$ apart from the interconnection nodes A and B.

In fact the synchronization node $CM_A$ considered to be the "network cycle master" and the node 208 capable of transmitting and receiving isochronous data are connected to the bus $b_A$, whilst the synchronization node $CM_B$ considered to be the "cycle master" of the bus be and the isochronous node 210 are connected to the bus $b_B$.

Figure 3:
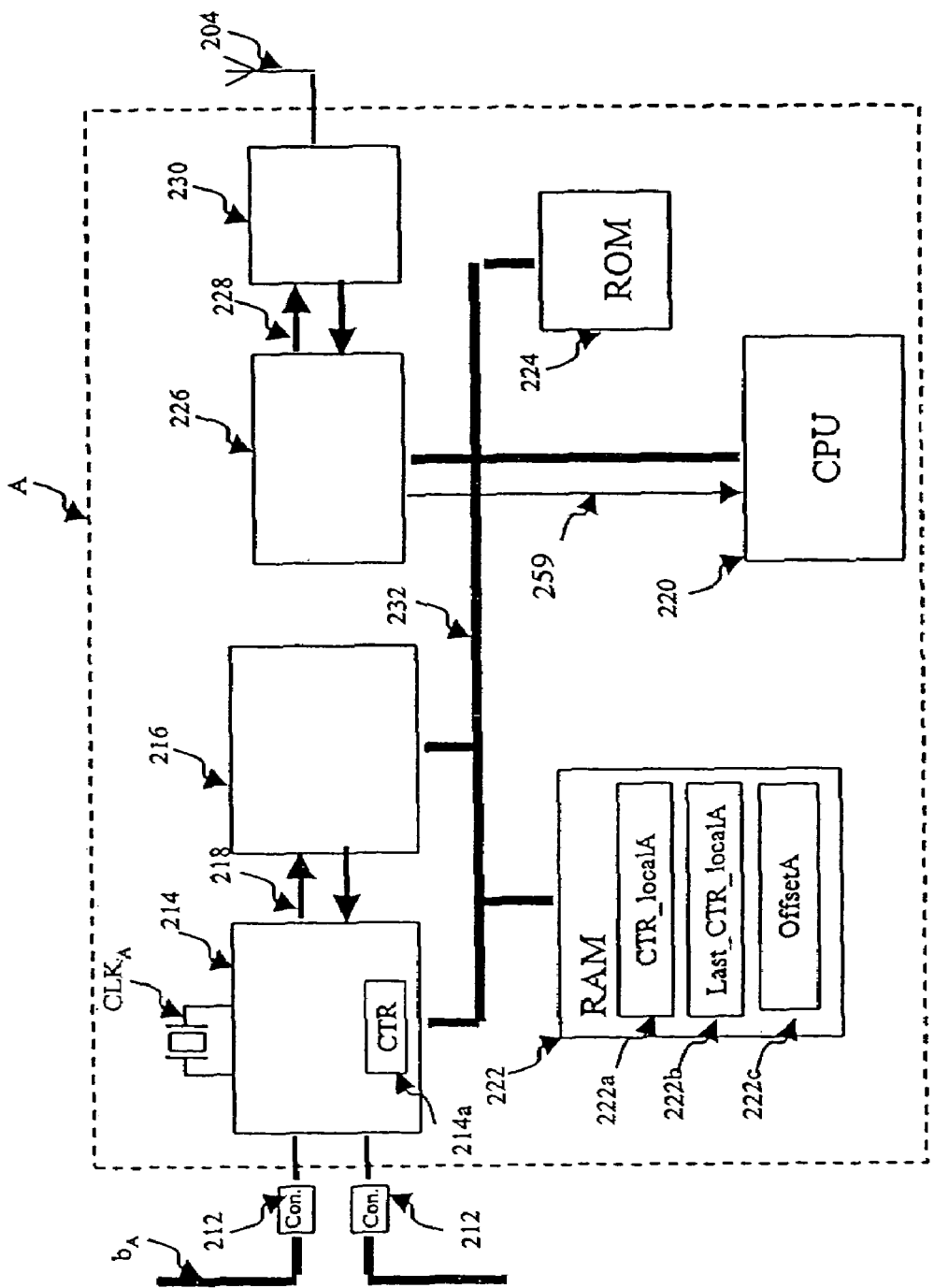
FIG. 3 is a schematic view of an interconnection node A constituting the radio bridge of FIG. 2.

As depicted in more detail in FIG. 3, the interconnection node denoted A considered here to be the radio transmitter is connected to the serial communication bus $b_A$ by connectors 212.

The node A has a 1394 physical interface circuit denoted 214 and a circuit 216 fulfilling the functions of the 1394 physical layer and which checks, at a higher level, the asynchronous and isochronous flows and the resources of the bus $b_A$.

Such circuits are connected together by a bus 218 and consist for example of a component PHY TSB21LV03A and a component LINK TSB12LV01A sold by the company Texas Instruments.

The circuit 214 contains a register 214a referred to as the "cycle time register", denoted CTR, in which there is contained the current value of the isochronous cycle peculiar to the bus $b_A$. This current value is incremented at each clock pulse generated by the local clock or internal oscillator ($_{CLKAA}$) of the interconnection node A.

When the node A is in operation, the circuit 214 manages the information exchanges on the bus $b_A$ using the access and arbitration protocols peculiar to IEEE 1394 standard.

The node A also has a calculation unit CPU 220, a temporary storage means of the RAM type denoted 222 containing several registers denoted 222a to 222c and a permanent storage means of the ROM type denoted 224.

The node A has a radio modem 226 connected by a bus 228 to a radio unit 230 which is equipped with the radio antenna 204.

A local bus denoted 232 connects the different elements of the code A together.

The information exchanged on the bus $b_A$ is stored in a buffer area of the storage means 222. This buffer area will also be used during the transmission of information between the interconnection nodes A and B.

Figure 4:
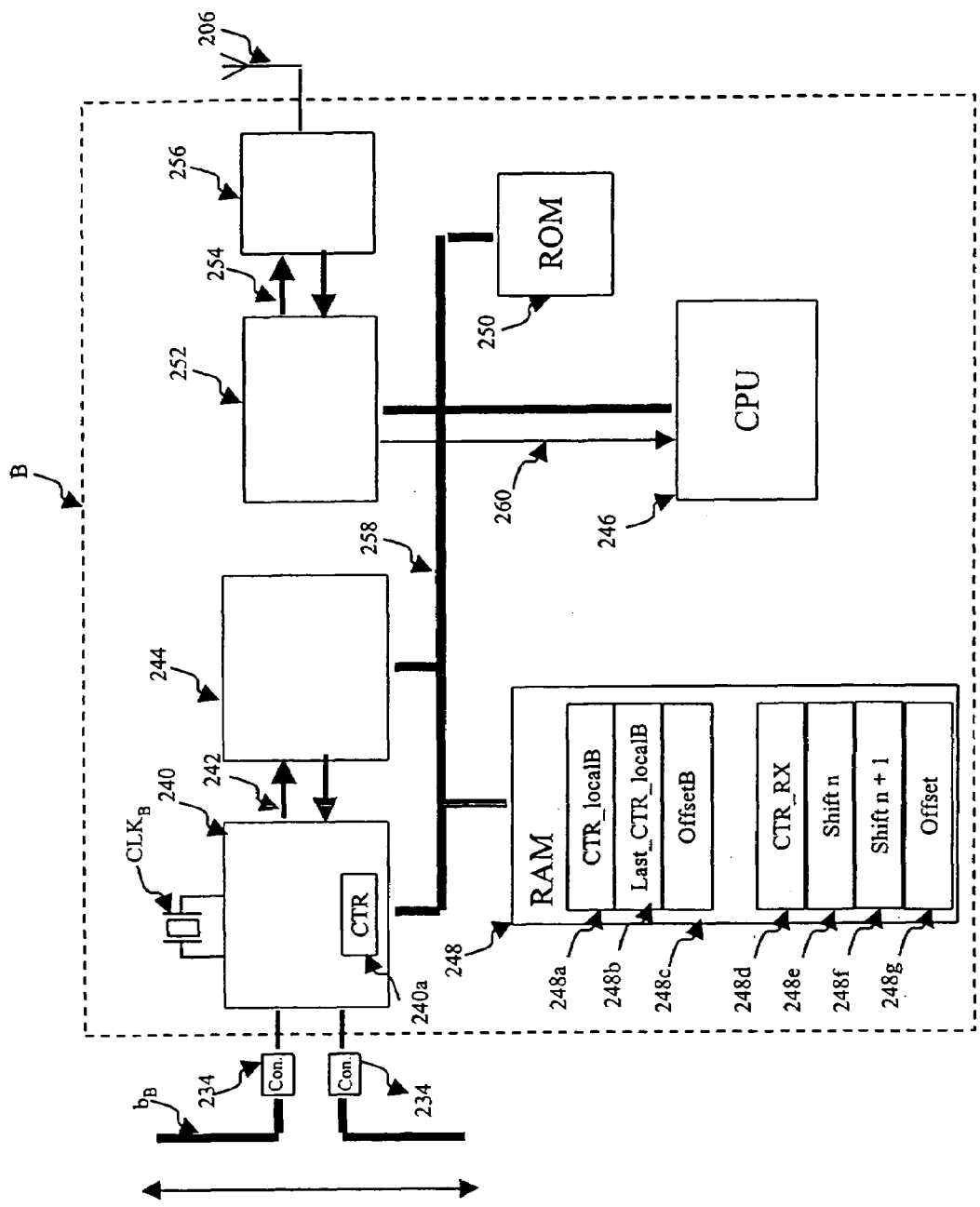
FIG. 4 is a schematic view of an interconnection node B constituting the bridge depicted in FIG. 2.

FIG. 4 depicts the interconnection node B in detail.

The interconnection node B, considered here as the radio receiver, is connected to the serial communication bus be by connectors 234.

In a similar manner to that which has just been described for node A, node B has a 1394 physical interface circuit denoted 240 connected by a bus 242 to a circuit fulfilling the functions of the 1394 physical layer denoted 244, a calculation unit CPU denoted 246, a temporary storage means of the RAM type denoted 248 containing several registers 248a and 248g, a permanent storage means 250 and a radio modem 252 connected by a bus 254 to a radio unit 256 which is equipped with the radio antenna 206.

A local bus denoted 258 connects together all these elements.

As indicated in FIG. 4, the physical interface circuit 240 uses a clock or internal oscillator $CLK_B$.

Figure 5A:
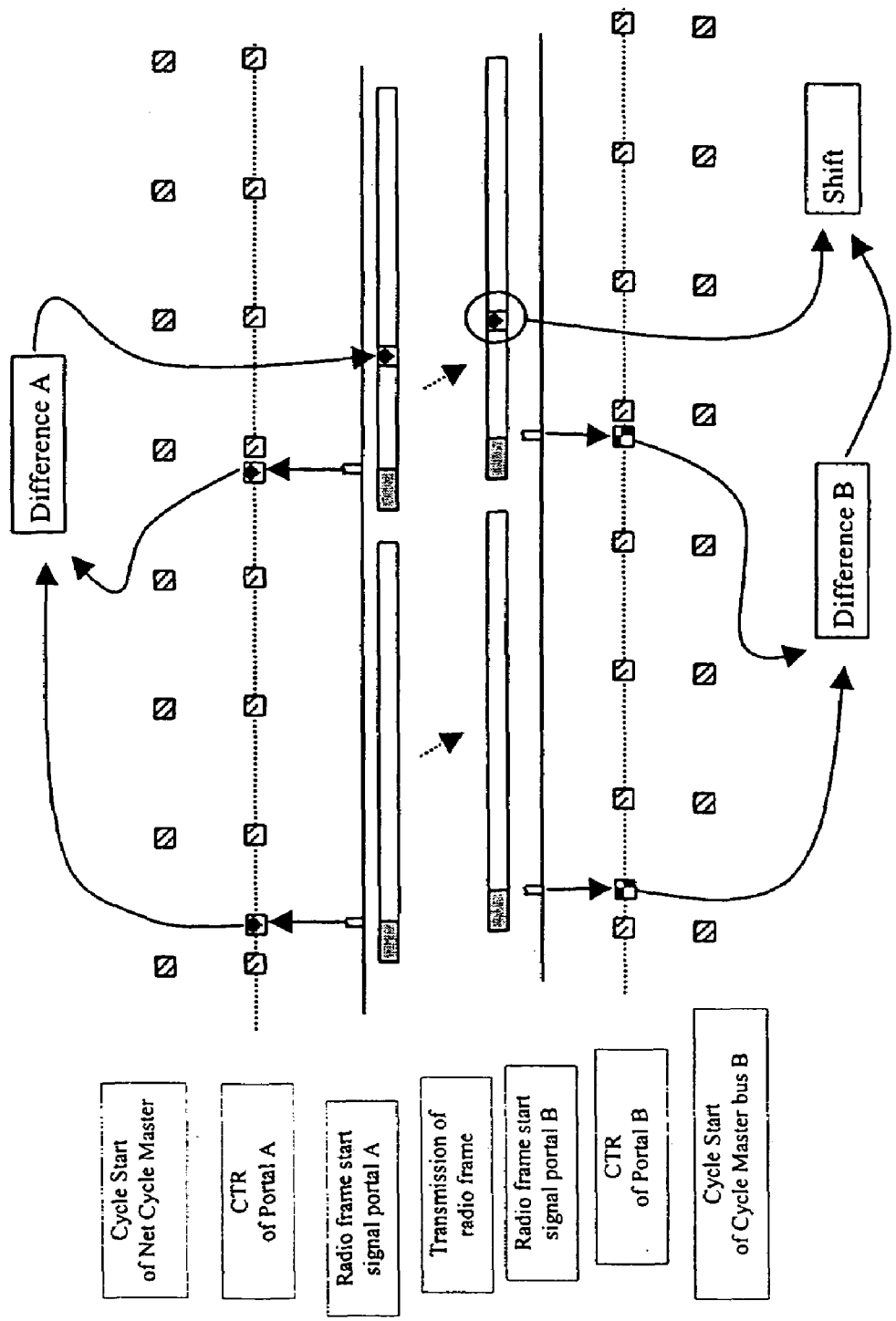
FIG. 5a illustrates schematically the principle of the synchronization of the isochronous cycles between the buses $b_A$ and $b_B$, according to a first embodiment of the invention.

The different elements of the interconnection node B operate identically to those of the interconnection node A described above. FIG. 5a depicts schematically the principle of the synchronization of the isochronous cycles between the buses $b_A$ and $b_B$ according to a first embodiment of the invention.

Figure 5B:
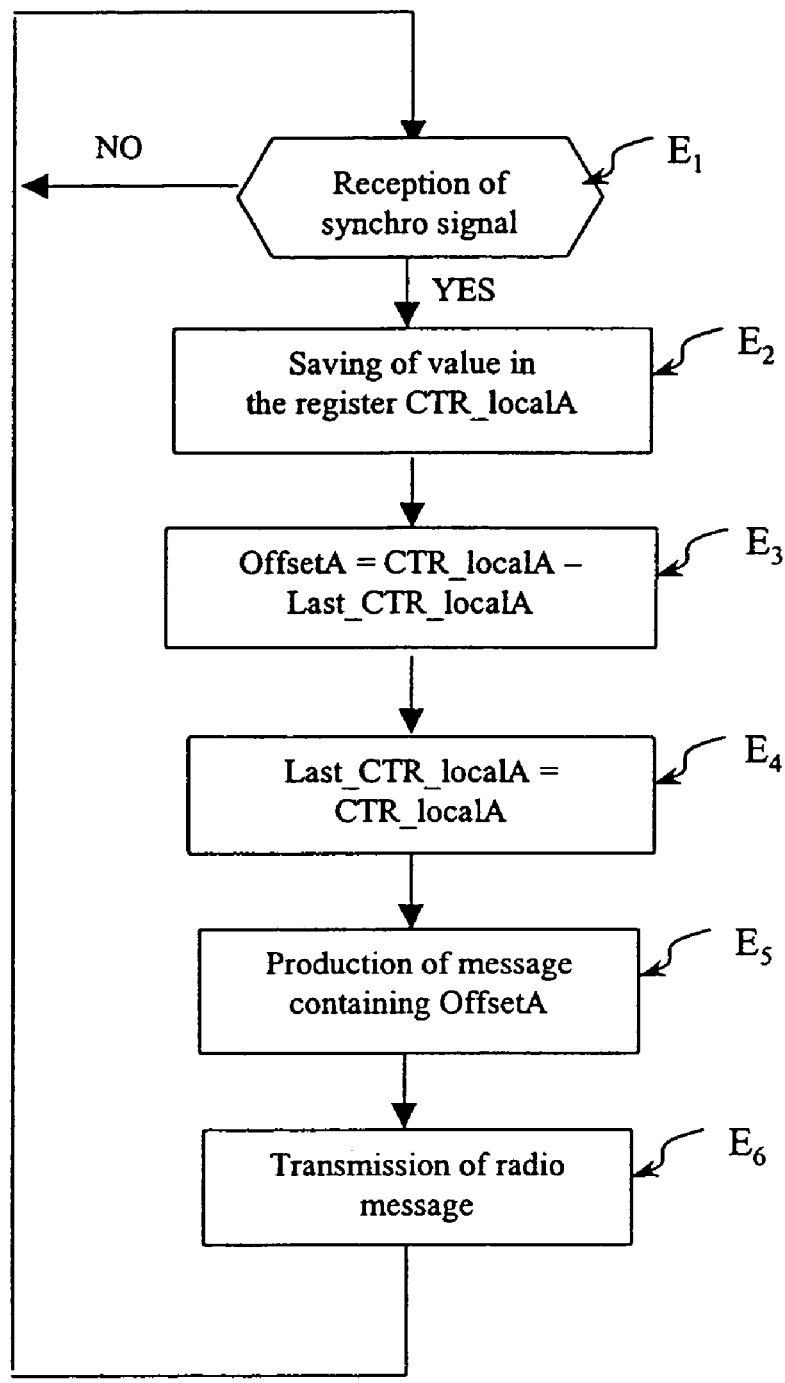
FIG. 5b depicts the algorithm of the synchronization method according to a first embodiment of the invention, implemented at the interconnection node A of FIG. 3.
Figure 5C:
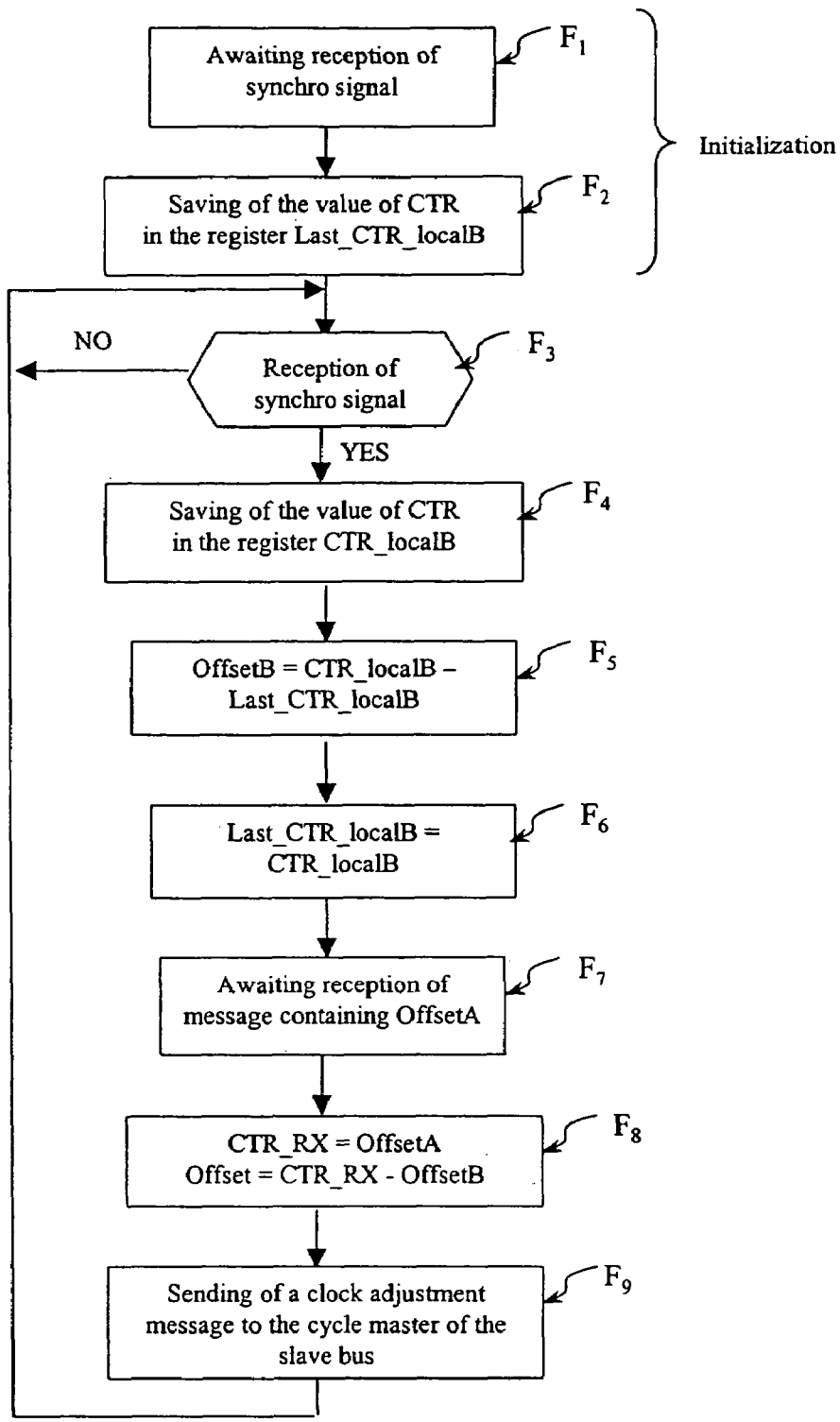
FIG. 5c depicts the algorithm of the synchronization method according to the first embodiment of the invention, implemented at the interconnection node B of FIG. 4.

FIGS. 5b and 5c describe respectively the algorithms representing the different steps of the method according to the first embodiment of the invention, which are implemented at the transmitting interconnection node A, in a computer program stored in the storage means 224, and, at the receiving interconnection node B, in a computer program stored in the storage means 250 of node B.

A method according to the first embodiment of the invention will now be described with reference to FIGS. 2 to 4 and 5a to 5c.

The present invention uses the concept of reference moment and reference event, the reference moment identifying the appearance of a reference event at one of the nodes A and B. For example, the reference event considered is the start of a data frame transmitted between nodes A and B and the reference moment corresponds to the moment when this frame starts.

More precisely, the reference time at node A marks the time of the start of transmission of the data frame whilst the reference time of node B marks the time of the start of reception of this same data frame.

Naturally, the reference time can correspond to any other event on which the transmitter and receiver must synchronize. In addition, these reference times do not necessarily appear periodically. Thus the present synchronization method applies equally well to data frames of variable duration.

It should be noted that the appearance of the reference events is not necessarily periodic.

FIG. 5a depicts the cycle start signals at each bus $b_A$ and $b_B$ ("cycle start packet"), the contents of the cycle time registers CTR at the interconnection nodes A and B, the reference times $t_A$ and $t'_A$ corresponding respectively to the transmission start times of two consecutive data frames at nodes A and B, and the reference times $t_B$ and $t'_B$ of the starts of reception of the same two consecutive data frames, at the interconnection node B.

At each isochronous cycle start, that is to say every 125 microseconds±12 nanoseconds, the cycle master of the network $CM_A$ and the cycle master $CM_B$ of the bus $b_B$ transmit a cycle start signal over their respective serial communication buses.

These cycle start signals contain the value of the cycle time register CTR of each cycle master, this value being supplied by the internal clock of the cycle master which serves as a reference for all the nodes located on the bus under consideration.

The cycle time register CTR represents the number of pulses N generated by the internal clock of the "cycle master" under consideration $CM_A$ or $CM_B$.

Thus the interconnection nodes A and B, as well as all the nodes located on the buses $b_A$ and $b_B$, will read the content of the cycle start signals transmitted over the buses and will update, at each isochronous cycle start, their cycle time registers CTR contained, for nodes A and B, respectively in the circuits 214 and 240 of FIGS. 3 and 4. The current value contained in their cycle time registers CTR is incremented at each clock pulse generated by the local clock or internal oscillator of the corresponding interconnection node.

An explanation will now be given of the way in which the reference times are determined with respect to the start of the data frame.

When a data frame is transmitted by radio by the interconnection node A, the latter generates, firstly, a radio synchronization preamble depicted in FIG. 5a by shaded areas, followed by the useful data to be transmitted. These data, which are stored in the buffer area of the storage means 222 (FIG. 3), are read by the radio modem 226.

At the end of transmission of the radio synchronization preamble, the interconnection node A generates a radio frame start signal denoted 259 in FIG. 3 which is intended for the calculation unit 220.

The time of transmission of this radio frame start signal corresponds to the reference time denoted $t'_A$.

A description will now be given of the method of the synchronization between the nodes $CM_A$ and $CM_B$, according to the invention, as implemented, firstly, in the node A (FIG. 5b) and then in node B (FIG. 5c).

As soon as this signal is received, in accordance with step $E_1$, of the method according to the invention (FIG. 5b), the calculation unit reads the content of the register CTR of the circuit 214 and stores a value read in a register called "CTR_localA" and denoted 222a of the storage means 222 (step $E_2$).

This value, denoted $N(t'_A)$, corresponds to the reference value representing the reference time $t'_A$ and represents a number of pulses emitted by the clock of the node $CM_A$.

This value corresponds to the current content of the cycle time register CTR of the interconnection node A regularly updated by the synchronization node $CM_A$ when the cycle start signal is transmitted.

It should be noted that, between two updates of the register CTR 214a taking place each time a cycle start signal is received by node A, the register is incremented at the rate of the local clock $CLK_A$ of node A.

However, there is no risk, at the reference time related to the transmission on a frame, of the value of the register CTR 214a not being the current value of the register CTR of the distant node $CM_A$.

This is because the precision of the local clock of the interconnection node A means that, between two successive updates, following the reception of two cycle start signals, the value of the register 214a remains perfectly identical of the value of the cycle time register CTR of the node $CM_A$. This condition would not be fulfilled if a cycle start signal were lost or received erroneously.

It will be noted in FIG. 5a that the reference value $N(t'_A)$ is marked on the axis corresponding to the values of the cycle time register CTR of the interconnection node A by an arrow starting from the reference time $t'_A$ situated below.

The radio frame start signal 259 also triggers the determination of a first "item of information" within the meaning of the present invention, and which represents a difference between two reference times $t'_A$ and $t'_A$, $t'_A$ being the reference time determined with respect to the data frame i–1 transmitted previously (see FIG. 5a).

More precisely, this first item of information is determined by calculating the difference of the reference values representing each of the reference times $t'_A$ and $t_A$.

Thus the difference is made between the content of the register "CTR localA", which contains the reference value $N(t'_A)$ and the content of the register called "Last CTR localA" and denoted 222b in FIG. 2 (step $E_3$).

This last register contains a reference value $N(t_A)$ representing the previous reference time tA and which was stored previously.

This difference $N(t'_A)-N(t_A)$ is stored in the register called "Offset A" and denoted 222c in FIG. 3.

It should also be noted that the recently determined reference value, $N(t'_A)$, is stored in the register "Last_CTR_localA" from the content of the register "CTR_localA" in step $E_4$.

In accordance with step $E_5$ of the method according to the invention (FIG. 5b) the radio modem 226 of the interconnection node A reads the register "Offset A" 222c of the storage means 222 and inserts its, content in the data frame i in the form of a message.

The synchronization method of the invention next includes a step E6 of transmitting the content of the register "Offset A" at the same time as the useful data of the data frame.

The method according to the invention as implemented in node B and whose algorithm depicted in FIG. 5c will now be dealt with.

During an initialisation phase, the method according to the invention first of all makes provision for a step $F_1$, of awaiting reception of a synchronization signal, and then a step $F_2$ during which the value of the cycle time register CTR denoted 240a in FIG. 4 is stored in a register called "Last_CTR_localB" and denoted 248b in this same figure.

When the radio data frame i for which the reference time $t'_A$ has been determined is received, the interconnection node B uses the radio synchronization preamble of this frame in order to synchronize itself.

As soon as the end of the radio synchronization preamble of this frame occurs, the interconnection node B generates locally a radio frame start signal denoted 260 in FIG. 4 and which is intended for the calculation unit 246.

The time of appearance of the radio frame start signal 260 corresponds to the reference time $t'_B$ of the start of reception of the radio frame.

The method according to the invention includes a test step F3 for determining whether the radio frame start signal of the synchronization signal has been received.

The radio frame start signal received by the calculation unit 246 triggers the storage, in a register of the storage means 248 called "CTR_localB" denoted 248a, of the current value of the cycle time register CTR denoted 240a of the circuit 240 (step $F_4$).

The current value of this register constitutes a reference value representing the reference time $t'_B$ and is denoted $N(t'_B)$.

The radio frame start signal also triggers the determination of a second "item of information", within the meaning of the present invention, and which represents a difference between the two reference times $t'_B$ and $t'_B$.

The reference time $t_B$ indicated in FIG. 5a corresponds to the time of reception by the interconnection node B of the previous radio data frame i–1.

More particularly, the determination of this second item of information is dependent on the calculation of the difference between the reference values representing each of the reference times $t'_B$ and $t_B$.

In this way the difference is formed between the content of the register "CTR_localB" which contains the reference value $N(t'_B)$ and the content of the register "Last_CTR_localB" denoted 248b in FIG. 3 and which contains the reference value $N(t_B)$ (step $F_5$).

This difference or second item of information N(t'$_B$)−N(t$_B$) is stored in the register "Offset B" denoted 248c of the storage means 248.

It should also be noted that the content of the register "CTR_localB" (N(t'$_B$)) is stored in the register "Last_CTR_localB" of the storage means 248 (step F$_6$).

In addition, the interconnection node B extracts from the useful data transmitted in the radio data frame i, coming from the interconnection node A, the message containing the value of the register "Offset A" denoted 222c (step F$_7$).

This value or first item of information (N(t'$_A$)−N(t$_A$)) is stored in a register 248d of the storage means 248 in FIG. 4 and called "CTR_RX".

It should be noted that the first item of information determined represents the period elapsed between the two reference times t$_A$ and t'A whilst the second item of information represents the period elapsed between the two reference times tB and t'e (FIG. 5a). The period between the reference times tA and t'A (or respectively tB and t'B) forms what is termed a reference period.

The synchronization method according to the first embodiment of the invention then makes provision for comparing with each other the first and second items of information determined above.

To do this, the interconnection node B calculates the difference between the content of the register "CTR RX" and the content of the register "Offset B" of the storage means 248 (step F8) and then stores this difference in another register of the temporary storage means 248 called "Offset" and denoted 2488.

The result of this comparison is written (N(t'$_B$)−N(te))−(N(t'$_A$)−N(t$_A$)) and supplies the value of any offset between the clocks of the synchronization node CM$_A$ of the bus bA and the synchronization node CMB$_B$ of the bus bB.

This offset is supplied as a number of clock pulses.

The step of comparison between the first and second items of information therefore makes it possible to check the frequency synchronization between the two synchronization nodes under consideration.

Thus, when a value of the offset is thus derived from this comparison step, the interconnection node B informs the synchronization node CMB$_B$ of the bus bB of the value of this offset by means of a suitable adjustment message (step F9).

Following this message, the node CM, then makes a correction to the value contained in its cycle time register CTR in order to remain synchronized with the synchronization node CM$_A$.

The node CM, then sends to all the nodes on the serial communication bus bB, including the interconnection node B, cycle start signals in order to synchronize the different clocks of the nodes with the clock of the node CMB$_B$.

Figure 6A:
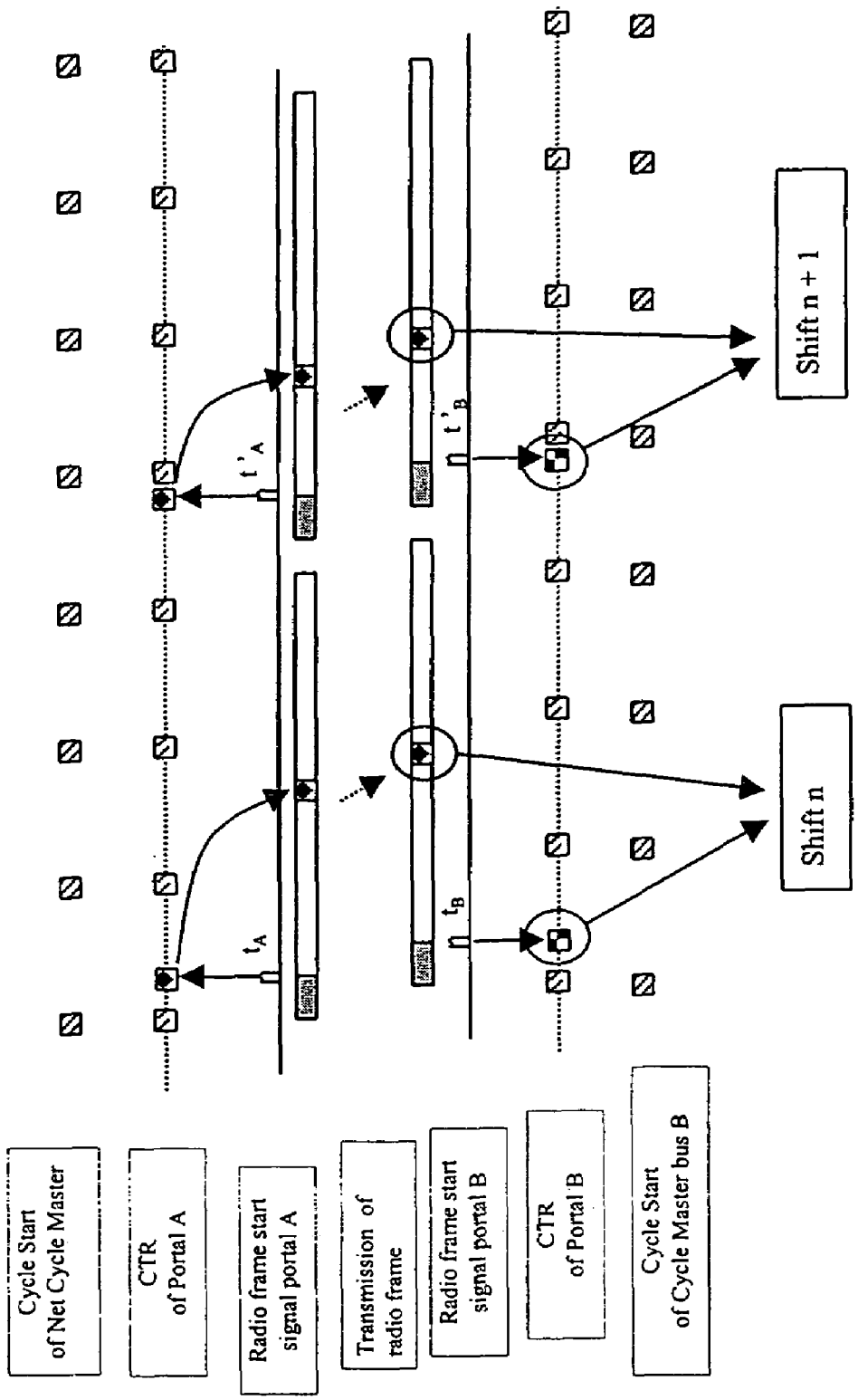
FIG. 6a illustrates schematically the principle of the synchronization of the isochronous cycles between the buses $b_A$ and $b_B$, according to a second embodiment of the invention.

FIG. 6a depicts schematically the principle of the synchronization of the isochronous cycles between the buses bA and bB according to a second embodiment of the invention. The same elements as those of FIG. 5a are repeated in FIG. 6a.

Figure 6B:
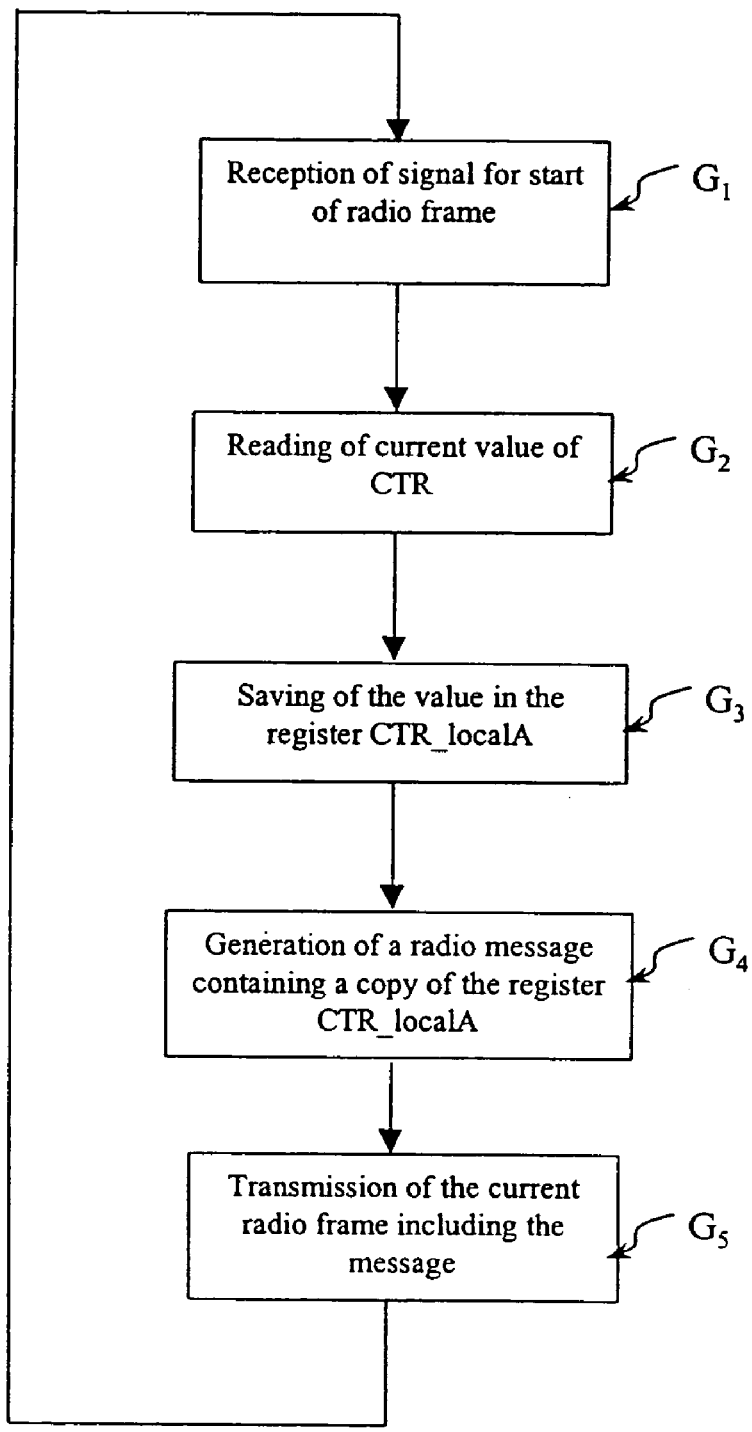
FIG. 6b depicts the algorithm of the synchronization method according to a second embodiment of the invention, implemented at the interconnection node A of FIG. 3.

FIG. 6b is an algorithm showing the different steps of the synchronization method according to the second embodiment of the invention and which is implemented in a computer program stored in the storage means 224 of the interconnection node A.

Figure 6C:
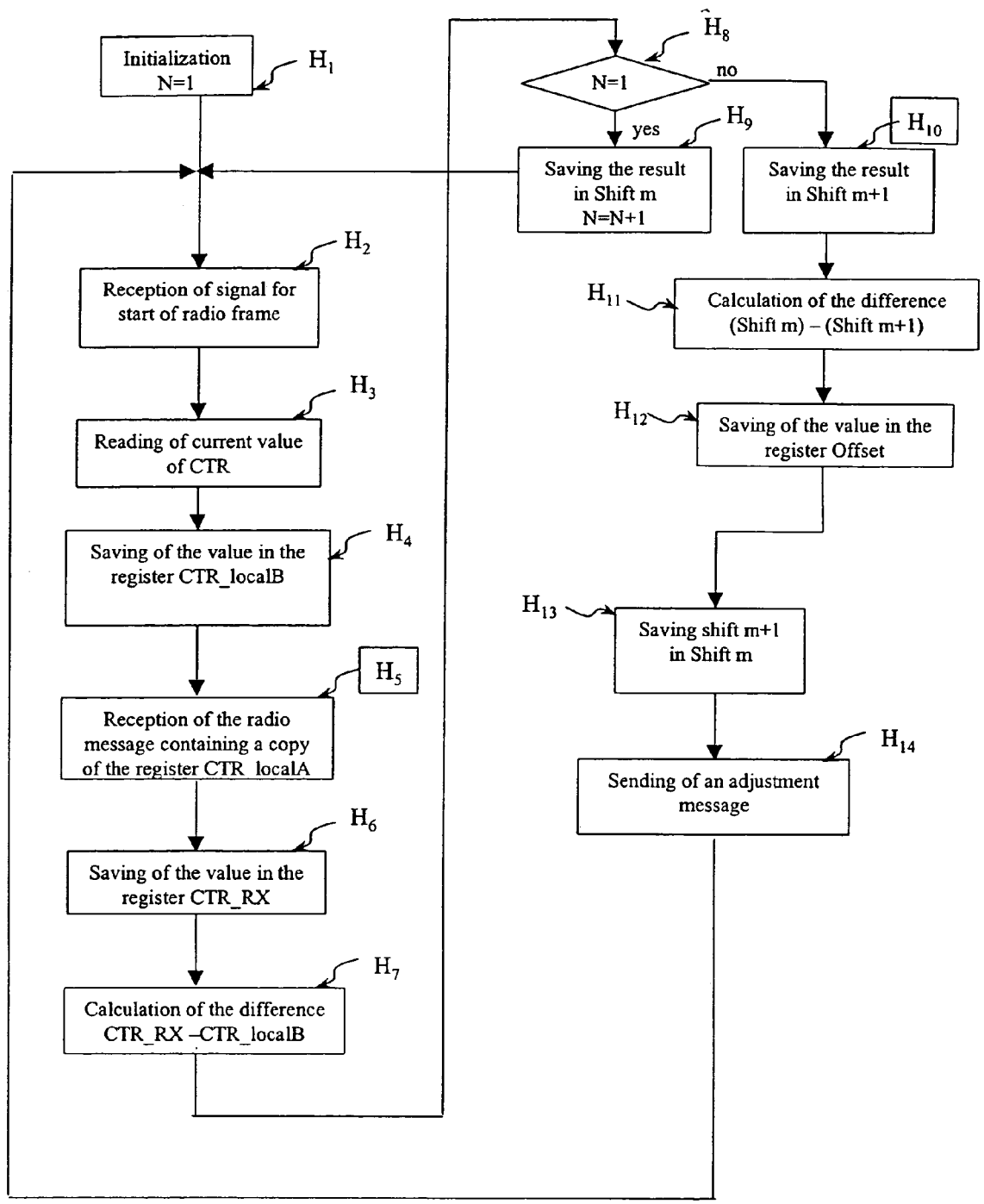
FIG. 6c depicts the algorithm of the synchronization method according to a second embodiment of the invention, implemented at the interconnection node B of FIG. 4.

FIG. 6c is an algorithm representing the different steps of the synchronization method according to the second embodiment of the invention and which is implemented by a computer program stored in the storage means 250 of the interconnection node B.

A description will now be given of the method of synchronization between two synchronization nodes CM$_A$ and CMB$_B$ according to a second embodiment of the invention, with reference to FIGS. 2 to 4 and 6a to 6c.

The method will firstly be described, as implemented in the interconnection node A (FIG. 6b) and then in the interconnection node B (FIG. 6c).

When a radio data frame is transmitted by the interconnection node A, the radio modem 226 reads the data to be transmitted in a buffer area of the storage means 222.

The interconnection node A firstly sends a radio synchronization preamble and then, secondly, sends useful data to be transmitted to the interconnection node B.

When the synchronization preamble ends, the interconnection node generates a radio frame start signal 259 (FIG. 3).

The end of this radio frame start signal identifies a reference time denoted tA which is fixed with respect to the clock of the interconnection node A synchronized by the clock of the synchronization node CM$_A$.

On reception of this radio frame start signal (step G, of FIG. 6b), the calculation unit 220 reads the content of the CTR register 214a of the circuit 214 (step GZ) and stores the value in the register "CTR localA" denoted 222b of the storage means 222.

This reference value denoted N(t$_A$) represents the reference time tA and represents the number of pulses generated by the clock of the synchronization node CM$_A$.

Saving the reference value N(t$_A$) in the register "CTR localA" corresponds to step G3 of the algorithm depicted in FIG. 6b.

When the radio data frame i-1 is transmitted, the radio modem 226 of the interconnection node A reads the register "CTR localA" and inserts the reference value N(t$_A$) in the data frame (step G4).

The radio frame is then transmitted to the radio unit 230 in order to be amplified therein and to undergo a frequency transposition before being sent by means of the radio antenna 204 (step G5).

The synchronization method implemented at the interconnection node B then carries out an initialisation step by fixing a variable N at 1 (step H,).

When the radio data frame i-1 is received by the interconnection node B, its radio modem 252 writes the data received in a data buffer area in the storage means 248.

The interconnection node B carries out a radio synchronization step using the radio synchronization preamble present at the start of the framed received.

At the end of the synchronization preamble, the node B generates a radio frame start signal 260 making it possible to identify a reference time tB (FIG. 6a).

After an initialisation step H, where a variable N is set to 1, as soon as this radio frame start signal is received (step HZ of FIG. 6) the calculation unit 246 reads the content of the cycle time register CTR 240a of the circuit 240 (step H3) containing a reference value denoted N(tB) which represents the reference time tB.

The calculation unit 246 then stores the value read in a register "CTR IOCalB" denoted 248a of the storage means 248 (step H4).

In accordance with steps H5 and H6 of the algorithm depicted in FIG. 6c, at the time of reception, the radio modem 252 reads, in the data frame received, the specific synchronization message sent by the interconnection node A and stores it in a register called "CTR RX" denoted 248d of the storage means 248.

The calculation unit 246 then determines a first "item of information" within the meaning of the invention which represents a difference between the reference times tA and to by calculating the difference between the content of the registers "CTR RX" and "CTR_IocaIB".

By proceeding thus, the calculation unit forms the difference between the two reference values N(tB) and $N(t_A)$ identifying the two reference times tB and tA (step H,).

This first item of information is then stored by the calculation unit 246 in a register "Offset m" denoted 248e in FIG. 3 (steps H. and 1-110).

The value of N being equal to one, step H$ is followed by step H9, step H9 saving the difference calculation result of step H7 into a register called shift m and incrementing the value of N.

On reception of the following data frame i, the reference values contained in the registers "CTR_IocaIB" and "CTR RX" are updated by new values, respectively N(t'e) and $N(t'_A)$.

These new reference values represents reference times t'e and VA determined from the same data frame i, consecutive on the first i−1, and transmitted from the interconnection node A to the interconnection node B.

The algorithm of FIG. 6c then includes steps H2 to H, during which there is determined a second "item of information" within the meaning of the invention which represents a difference between the two reference times t'A and t'e, this second item of information corresponding in fact to the difference between the two reference values $N(t'_B)$ and $N(t'_A)$ which identify the two reference times t'B and t'A.

From the second received frame, N will be different from 1 so step H8 will be followed by step H10. On that step, the difference calculation result of step H7 will be stored in a register called shift m+1. A difference calculation will be made by the calculation unit 246 on the content of registers shift m et shift m+1 at step H11 and result will be stored at step H12 in the offset register 248g of the storage means 248 of FIG. 3. This difference is expressed by the formula $N(tB)-N(t_A)-(N(t'_B)-N(t'_A))$.

Step H12 is followed by step H13 which consist in replacing the content of register shift m by the content of register shift m+1.

The content of this register 248g supplies a value of the offset, counted as a number of clock pulses of the synchronization node $CM_A$, between the duration of an isochronous cycle of the bus bA and that of an isochronous cycle of the bus bB.

When an offset is detected, the calculation unit 246 of the interconnection node B generates an adjustment message from this value of the offset and will store it in a data buffer area of the storage means 248.

The calculation unit then requests, at step H14, the circuit 244 to send this adjustment message over the bus bB to the synchronization node $CMB_B$ (step H,4).

The synchronization node of the bus bB interprets the adjustment message and corrects the frequency of transmission of its cycle start signals accordingly in order to propagate the synchronization of the isochronous cycle between the two buses bA and be.

In general terms, the offset corrections are effected in a manner which depends on the type of network interconnected by the radio bridge.

For example, in a case of a serial communication bus in accordance with IEEE 1394 standard, the corrections can be reflected by reducing or increasing the duration of the isochronous cycle on a single occasion or distributed over several isochronous cycles.

The distribution of the correction over several isochronous cycles may be dictated for example, by technical constraints: the impossibility of correcting more than one clock pulse by isochronous cycles, or the need to avoid an abrupt variation in the duration of a given isochronous cycle.

It can even be envisaged to wait before making a correction in order for example to be able to benefit from an automatic compensation at certain buses in the network according to modifications which are contrary with respect to each other.

It will be noted that FIG. 7 supplies a table indicating, for the different data frames i transmitted from node A to node B, with i=0, 1, . . . , 7, . . . , the different reference times, tq, tB N(°), tB(°)), t'q, t'B, . . . , tq('), tB (7), . . . and the reference periods considered with respect to the given reference times.

Advantageously, in this second embodiment of the invention, the loss of a data frame or the fact that it is incorrectly received do not prevent, as is the case with the first embodiment, the detection of the offset between the synchronization nodes CMq and $CMB_B$.

This is because the table of FIG. 7 indicates that the reference periods are considered, for the frames i=0 and i=1, between the reference times tq and VA (node A), tB and t'B (node B), and for the frames i=1 and i=2, between the reference times t'q and t''q (node A), t'B and t'B (node B).

On the other hand, It will be noted that the reference value N(tq(3)) corresponding to the reference time Q3) is not received by the node B, the corresponding field of the frame i=4 being for example affected by a transmission error.

Because of this, the reference period under consideration cannot take into account this reference time, but rather the following one: Q4).

Thus the reference period considered is defined between the times t"q and Q4) (node A) and between the times t"B and tB(°) (node B).

In this case, the items of information compared with each other for this reference period will be N(t"e)−N(t"q) and N(tB(4))−NN (4)).

This amounts to increasing the reference period in order to take account of any offsets, which have occurred, between the reference times t"q and Q4).

Thus the correction related to the reference times Q3) well automatically be taken into account at the next calculation, even if the transmitted data frame i=4 included errors.

Because of this, by virtue of the second embodiment of the invention, no information on the offset between the synchronization nodes $CM_A$ and $CMB_B$ is lost.

Likewise, according to this table, if the reference time te(5) is lost and if the node B cannot decode the reference values corresponding to the reference times Q5) and QS), then the reference period under consideration will be extended and defined between the times Q') and Q') (node A) and tB(4) and t13 (7) (node B).

As a variant, it will be noted that the fact of transmitting, not as indicated with reference to FIGS. 1 to 4 a first item of information $N(fA)-N(t_A)$ representing the period between the reference times tA and VA of the node A to the node B, but solely the reference values $N(t_A)$ and $N(t'_A)$ in isolation, from the node A to the node B, also makes it possible to determine the information $N(fA)-N(t_A)$ at the node B and to compare this with the other information also determined at the node B, $N(t'_B)-N(tB)$, in order to reach to the same results as during the description of the first embodiment of the invention.

It will be noted that $N(t'_B)-N(t'_A)-(N(tB)-N(t_A))$ is equal to $N(t'_B)-N(t_B)-(N(t'_A)-N(t_A))$, which shows that the two embodiments lead to the same calculation of offset.

In addition, it should be noted that, from the results obtained in the table of FIG. 7, which are therefore available at the node B, all the possible calculations between the different reference values contained in this table can be envisaged.

Moreover, the invention makes it possible to check the synchronization between the synchronization nodes $CM_A$ and $CMB_B$ even if the data frames have variable duration.

It should be noted that the present invention makes it possible to check the synchronization of several nodes connected to different serial communication buses with respect to the "Master" node where the latter is capable of broadcasting information to the nodes to be synchronized.

This applies particularly when the nodes communicate with each other by radio or optical link.

It should also be noted that, in a communication network according to the invention, it is possible to provide for a node in the network which is dedicated to generating a reference event common to all the nodes. The existence of this node makes it possible to use the invention when the reference events generated by the nodes to be synchronized are not sufficiently frequent or even when these events are non-existent (the nodes to be synchronized cannot be generated from the reference events by themselves).

In a third embodiment of the invention, the nodes or stations A and B constitute the cycle masters of the respective buses 10 and 12.

The bus denoted 10 is considered to be the "master" bus, whilst the bus denoted 12 is considered to be the "slave" bus.

It will be noted that an internal oscillator or clock denoted CLK1 generates a clock signal denoted H1 at the master bus and an internal oscillator or clock denoted CLK2 generates, at the slave bus, a clock signal denoted H2.

Each of the internal oscillators or clocks has a frequency equal to 24.576 MHz with a tolerance of 100 ppm.

Figure 8:
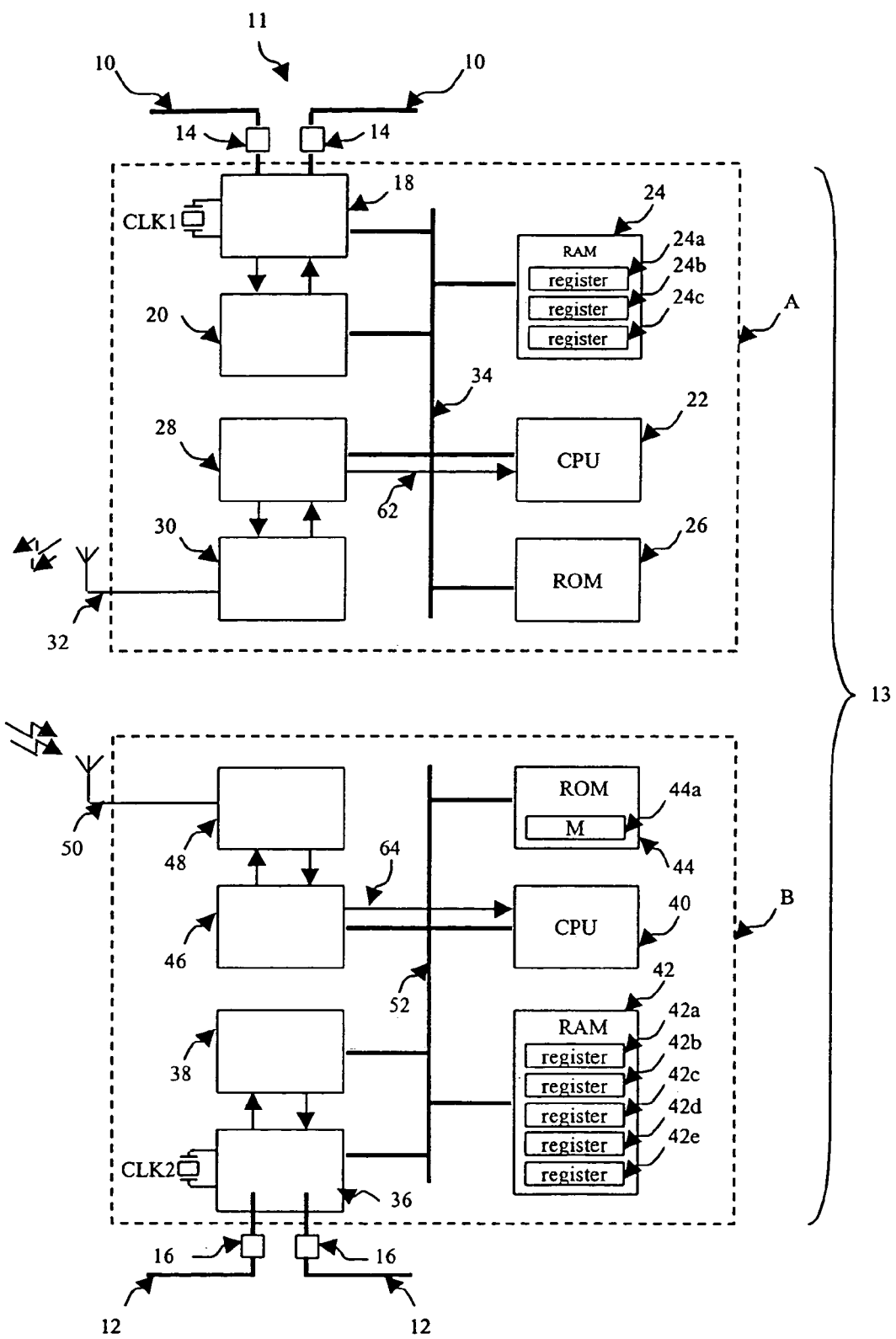
FIG. 8 is a view of a communication network according to a third embodiment of the invention, using a radio bridge 13 consisting of nodes A and B.

On FIG. 8, the node denoted A considered to be the radio receiver is connected to the serial communication bus 10 by connectors 14.

The node denoted B and considered to be the radio receiver is connected to the serial communication bus 12 by connectors 16.

The node A has a 1394 physical interface circuit denoted 18 and a circuit fulfilling the functions of the 1394 link layer denoted 20.

Such circuits consist for example of a component PHY TSB21LV03A and a component LINK TSB12LVO1A sold by the company Texas Instruments.

The node A also has a calculation unit 22, a temporary storage means of the RAM type denoted 24, containing several registers denoted 24a to 24c, and a permanent storage means denoted 26.

As depicted in FIG. 8, the node A has a radio modem 28 connected to a radio unit 30 which is equipped with a radio antenna 32.

A local bus denoted 34 connects the different elements of the node A together.

In a similar fashion to that which has been described for the node A, the node B has a 1394 physical interface circuit denoted 36, a circuit fulfilling the functions of the 1394 physical layer denoted 38, a calculation unit CPU denoted 40, a temporary storage means of the RAM type denoted 42 containing several registers 42a to 42e, a permanent storage means 44 containing a register 44a and a, radio modem 46 connected to a radio unit 48 which is equipped with a radio antenna 50.

A local bus denoted 52 connects all these elements together.

As indicated in FIG. 8, each physical interface circuit 18 for the node A and 36 for the node B functions with a clock or internal oscillator, CLK1 for node A and CLK2 for node B.

Figure 9:
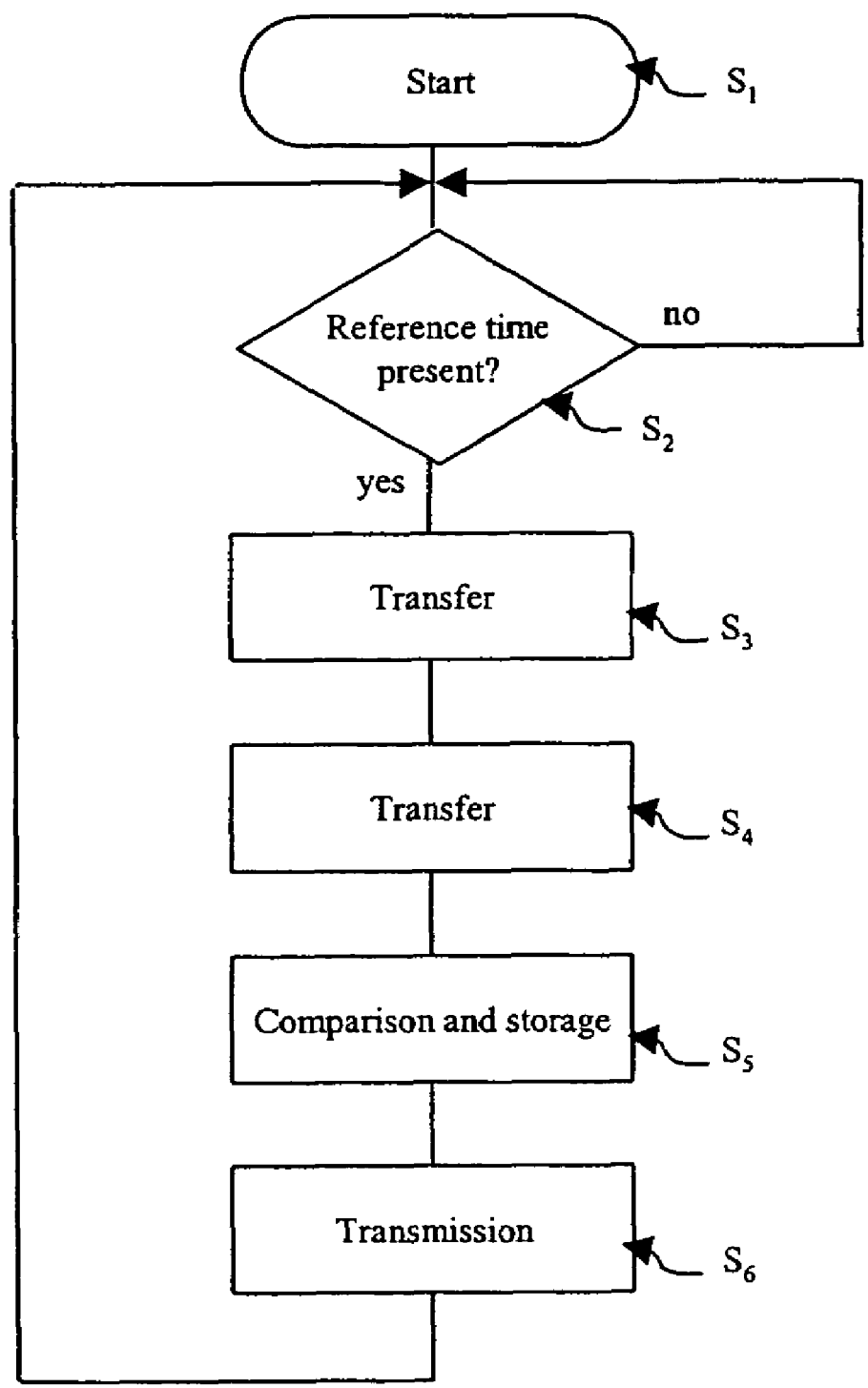
FIG. 9 depicts the algorithm of the synchronization method according to a first embodiment of the invention, implemented at the node A of FIG. 8.
Figure 10A:
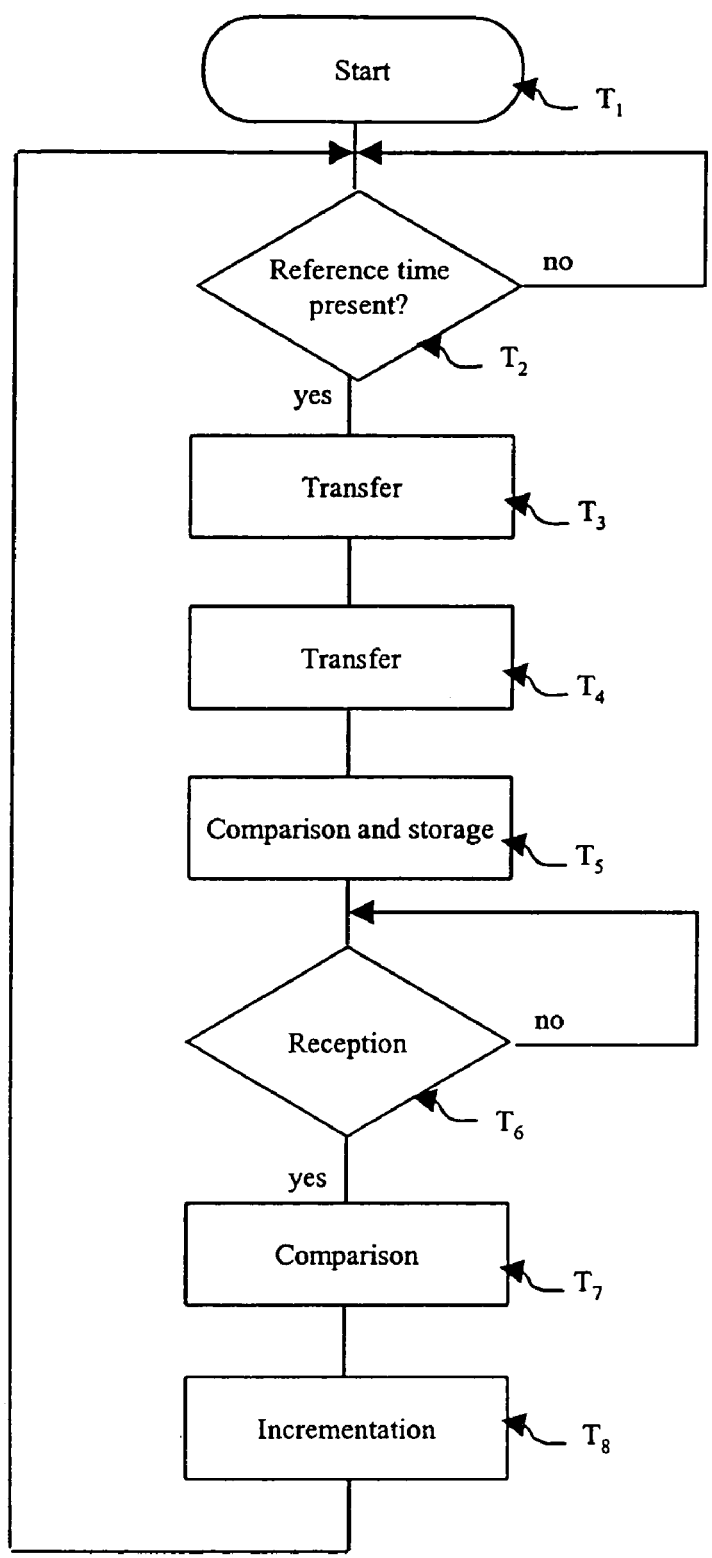
FIG. 10a depicts an algorithm for the synchronization method according to a first embodiment of the invention, implemented at the node B of FIG. 8.

FIGS. 9 and 10a illustrate respectively the different steps of the method according to the third embodiment of the invention which are implemented at the transmitter node A and receiver node B. These figures depict different instructions of a computer program stored, for the algorithm of FIG. 9, in the storage means 26 of the node A and, for the algorithm of FIG. 10a, in the storage means 44 of the node B.

The method according to the third embodiment of the invention will now be described with reference to FIGS. 8 to 10b.

In the 1394 physical interface circuit denoted 18 of the node A, a counter is incremented continuously with the internal oscillator or clock CLK1.

The size of this counter is K bits and its period is therefore $2^n$.

The present invention uses the concept of reference time and reference event, the reference time identifying the appearance of a reference event at one of the nodes A and B. For example, the reference event under consideration is the start of a data frame transmitted between nodes A and B, and the reference time corresponds to the time when this frame starts.

More precisely, the reference time at the node A marks the time of the start of transmission of the data frame whilst the reference time of the node B marks the time of the start of reception of this same data frame. At each node the reference times are determined in a time reference frame peculiar to the node under consideration from the internal clock of said node by means of a counter.

It should be noted that, if the clocks CLK1 and CLK2 are perfectly synchronous (same frequency), then the contents of the counters determining the two reference times will have a shift which will remain constant over time.

If on the other hand the clocks are not synchronous, then the shift between the contents of the counters mentioned above will no longer be constant, and the present invention is based on the variation in this shift in order to measure the deviation between the clocks CLK1 and CLK2.

Naturally, the reference time can correspond to any other event on which the transmitter and receiver must synchronize.

It should be noted that the appearance of the reference events is not necessarily periodic.

In order to detect the start of a data frame, both in the node A and in the node B, the radio modems of each node, denoted respectively 28 and 46, use appropriate synchronization sequences. For example, a sequence known to the transmitter and receiver is added at the start of each data frame. The receiver can thus, by applying an automatic correlation method to this known sequence, determine the start of the frame.

When the start of a frame is detected at each node, a signal 62 (node A), 64 (node B) is sent to the calculation unit CPU, respectively 22 (node A), 40 (node B), this signal indicating a reference time (FIG. 8).

After the step S, of FIG. 9, each time a reference time is determined for example at the node A (step S2), the reference time being denoted tA, the content of the counter in the 1394 physical interface circuit denoted 18 is saved in a register denoted 24a of the temporary storage means 24 of FIG. 8.

The above content of this register 24a is transferred into a second register 24b of the storage means 24 (step S3).

The two registers thus make it possible to save the value of the counter in the 1394 physical interface circuit 18 at the last two reference times, for example denoted tA and tA', which both correspond to the time of start of transmission of two consecutive data frames.

To each given reference time there corresponds a given reference value which represents the reference time. This reference value is stored in one of the registers 24a, 24b of the temporary storage means 24 of FIG. 8.

It should be noted that each reference value stored in the registers 24a and 24b corresponds, for example, to a number of clock pulses emitted by the clock CLK1 calculated modulo $2^n$.

All the operations (addition, subtraction, counting) are performed modulo 2 raised to the power of the size of the corresponding registers or counters. In addition, it is assumed that the result of the subtraction contains a sign bit.

After the transfer of the content of the register 24a to the register 24b (step S3) and of the content of the counter to the register 24a (step S4), the difference between the reference values stored in these two registers is determined (step S5). This difference corresponds to a first item of information representing an elapsed period of time, at the node A, between the reference times tA and tA'.

This first item of information is stored in the register denoted 24c in FIG. 8.

This register therefore contains the duration of a reference period counted in numbers of pulses of the clock or internal oscillator CLK1.

The first item of information representing the time elapsed between the two reference times tA and tA' and which is stored in the register 24c is transmitted from the node A (transmitter) to the node B (receiver) using the data frame transmitted as from the reference time tA' (step Ss).

The transmission step is performed by the radio equipment consisting of the elements 28, 30 and 32 of the node A, whilst the reception step at the node B uses the elements 46, 48 and 50 of said node B.

In a similar way to that which was described for the node A (the transmitter), a second item of information representing a time elapsed between two reference times tB and tB' is then calculated at the node B (the receiver).

These two reference times tB and tB' correspond to the reception times of the start of the data frames transmitted by the node A and for which the reference times tA and tA' were determined at said node A.

In the device 36 of the node B, a counter is incremented continuously with the internal oscillator or clock CLK2.

The size of this counter is K bits and its period is therefore equal to $2^n$.

After the step T, (FIG. 10a), each time a reference time tB or tB' is determined (step T2), as indicated above, a reference value representing this reference time is stored in the register 42a of the temporary storage means 42 of FIG. 8.

Thus the reference value corresponding to the reference time tB is stored in the register 42a and then transferred into the register 42b (step T3) when the second reference time tB' is determined (step T2) and when the corresponding reference value is transferred from the counter in the 1394 physical interface circuit 36 into the register 42a (step T4).

The second item of information representing the time elapsed between the two reference times tB and tB' is determined (step T5), and the difference formed between the two reference values stored in the registers 42a and 42b and identifying the two reference times tB and tB' is then stored in a register 42c of the storage means 42 of FIG. 8.

It should be noted, there also, that each reference value contained in one of the aforementioned registers corresponds to a number of clock pulses which are emitted by the clock or internal oscillator CLK2 of the node B:

It should be noted that the reference event associated with a data frame received by the node B (receiver) corresponds at this node to the time of the start of reception of said data frame.

The first item of information stored in the register 24c is received by the node B (step Ts).

If on the other hand no information is received by the node B, then the method according to the invention makes provision for once again, starting to await reception of information transmitted by the node A with a data frame.

It makes possible to make a comparison between the first and second items of information (step T,).

If the number of clock pulses is denoted N, the first and second items of informations are written respectively N(tA')−N(tA) and N (tB')−N(tB).

Any difference which can be detected between these two values represents the number of deviation clock pulses between the oscillators or clocks CLK1 or CLK2 during the reference period considered.

It is thus possible, knowing the deviation between the clocks CLK1 and CLK2 during the reference period, to correct the frequency of the signal H2 in order to keep it synchronous with H1.

If a difference is detected between these first and second items of information, the result obtained (the deviation) is added to the content of a register denoted 42d of the temporary storage means 42 of FIG. 8 (step T8).

This register 42d contains the total of the different deviations measured during all the reference periods which have been taken into account.

When two items of information or reference periods each representing the rate of the clock of the node under consideration are compared with each other, as just explained, the number of significant bits of the difference between these depends on the deviation between the two clocks and the duration of the reference period.

For example, two oscillators are taken whose clock frequencies are respectively 24.576 MHz−100 ppm and 24.576 MHz+100 ppm and a reference period of 1 ms, the difference detected between the two reference periods is approximately five clock pulses, which can be coded using three bits.

Thus the sizing of the registers at 1 byte, where one bit will be reserved for the sign, seems to be a sufficient choice.

This sizing of the registers concerns the registers denoted 24c, 42c and 42d of FIG. 2a.

The optimisation of the size of these registers and particularly of the register 42d is important given that it defines the bandwidth needed for transmitting the data over the radio link between nodes A and B.

Normally, when no deviation exists between the internal clocks CLK1 and CLK2, the first and second items of information each representing the time elapsed between the two reference times respectively tA, tA' and tB, tB' are equal.

However, when a deviation exists and a value is recorded in the register 42d, then a correction is necessary.

The purpose of this correction is to keep the frequency of the clock signal H2 more or less constant compared with the frequency of the clock signal H1.

It should be noted that, in this case, it is the clock signal H1 which is the reference.

The signal H2 can of course also constitute a reference with respect to which the clock signal H1 would be corrected.

The method according to the invention makes provision, in the event of a correction, for shortening or lengthening one or more periods of the clock signal H2 by a period equivalent to the number of clock pulses which are contained in the register 42d, and which represent the deviation noted between CLK1 and CLK2.

The distribution of the correction over several periods may be dictated, for example, by technical constraints: the impossibility of correcting more than one clock pulse per period, or the necessity of avoiding an abrupt variation in a given period.

It can even be envisaged waiting before effecting a correction in order, for example, to be able to benefit from an automatic compensation at certain buses in the network vis-a-vis the changes.

Figure 10B:
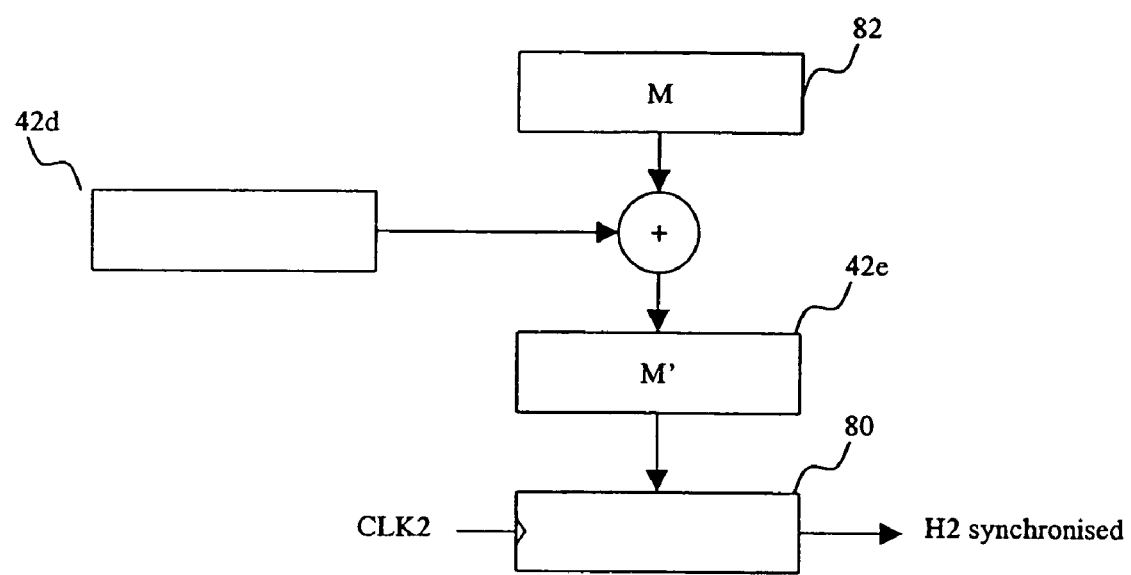
FIG. 10b is a schematic view of the different functional blocks used for synchronizing a clock signal H2 with respect to a clock signal H1.

FIG. 10b is a functional diagram illustrating, as example, the correction of the clock signal H2 with respect to the clock signal H1 when a deviation between the clocks or oscillators CLK1 or CLK2 is detected.

As depicted in FIG. 10b, the clock signal H2 corrected or synchronized according to the method of the invention is generated from the clock or oscillator CLK2 using a counter denoted 80.

The period of this counter is fixed by loading a value M' contained in the temporary storage means 42 of FIG. 8.

This value M' is an integer which corresponds to the division factor of the frequency of the clock CLK2 in order to obtain the frequency of the corrected or synchronized clock signal H2.

Moreover, another register denoted 82 contains the nominal division factor M between the frequencies of the clock CLK2 and of the clock signal H2 before correction.

In addition, the register 42d depicted on the left in FIG. 10b contains the total deviation denoted eC between the clocks or oscillators CLK1 and CLK2.

Thus the period of the counter 80 is corrected with the total deviation eC supplied by the register by means of the following formula: M'=M+AC.

It should be noted that this deviation k can be of positive or negative sign. When the deviation is of positive sign, M' will be equal to M plus the absolute value of e, The period of the counter 80 will then be increased, and the frequency of H2 will be decreased.

When the deviation is of negative sign, M' will be equal to M minus the absolute value of AC. The period of the counter 80 will then be decreased and the frequency of H2 will then be increased.

For the total deviation eC to be taken into account in the correction of the period of the counter, it is necessary for this deviation to be kept in the register 42d until the end of the current period of the counter. The register 42d has then to be reset to zero during the following period, and before the end thereof in order to avoid the same deviation being corrected twice.

If the correction of the deviation must be distributed over several periods, an intermediate register is necessary for containing the correction to be made to each period. After each correction, the register 42d containing the total deviation is decremented accordingly. The corrections are then made until the content of the register 42d is nil.

Figure 11:
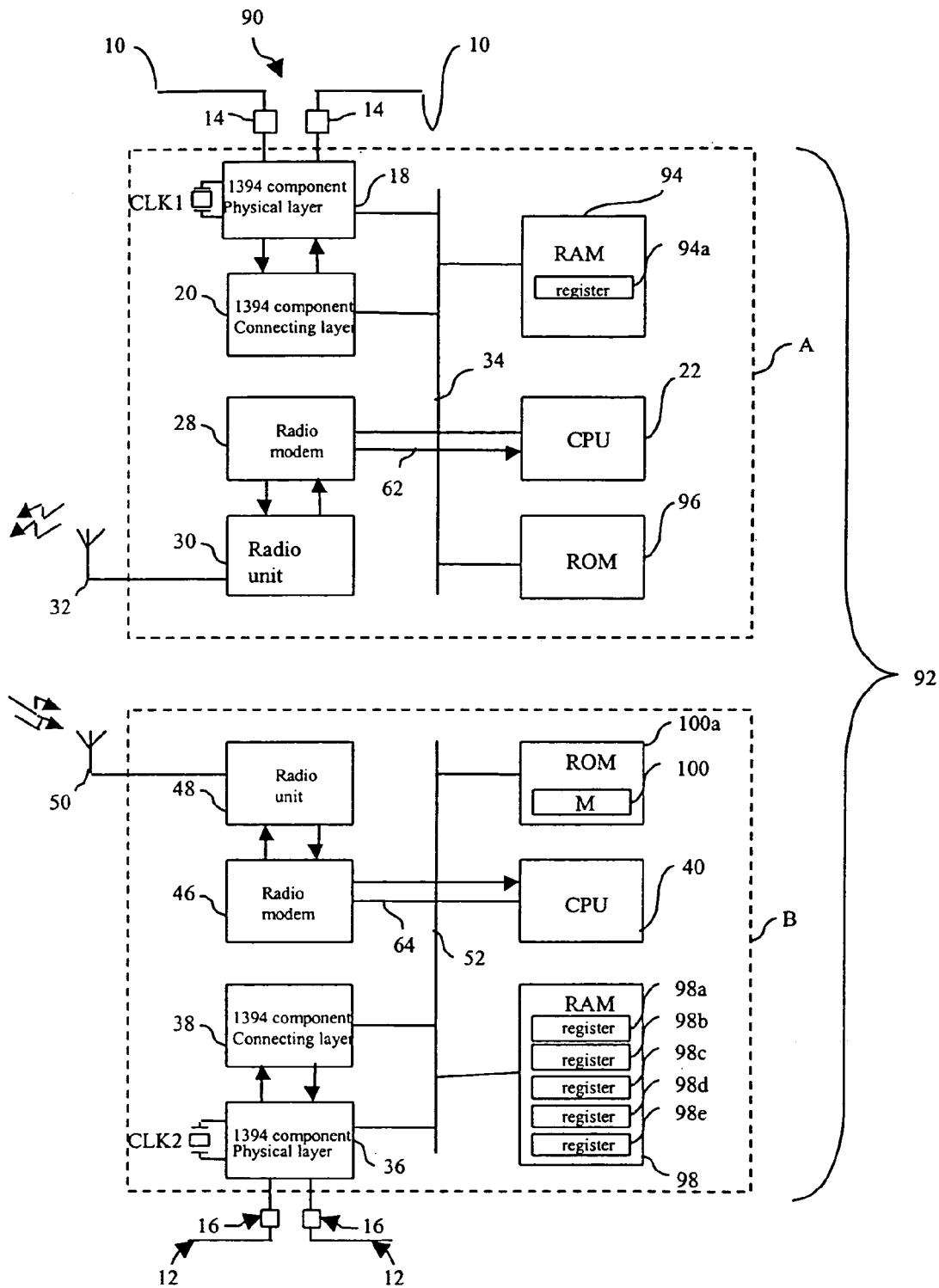
FIG. 11 is a general schematic view of a communication network according to a fourth embodiment of the invention, using a radio bridge 92 consisting of nodes A and B.

FIG. 11 illustrates a fourth, embodiment of the invention.

In this figure, the elements, which are not modified with respect to those of FIG. 8, keep the same references as in the latter.

As depicted in FIG. 11, the communication network according to the invention has a radio bridge denoted 92 which interconnects the serial communication buses in accordance with IEEE 1394 denoted 10 and 12 and serves; in some way, as an interface between them.

The bridge 92 has two stations or nodes denoted A and B and which are respectively a radio transmitter (node A) and a radio receiver (node B).

These nodes A and B are distinguished from those of FIG. 8 by their permanent and temporary storage means.

The node A has a temporary storage means RAM denoted 94 including a register 94a and a permanent storage means ROM denoted 96.

The permanent storage means 96 contains the computer program, the various instructions of which correspond to the steps of the method according to the second embodiment and which is implemented at the transmitter (node A).

Figure 12:
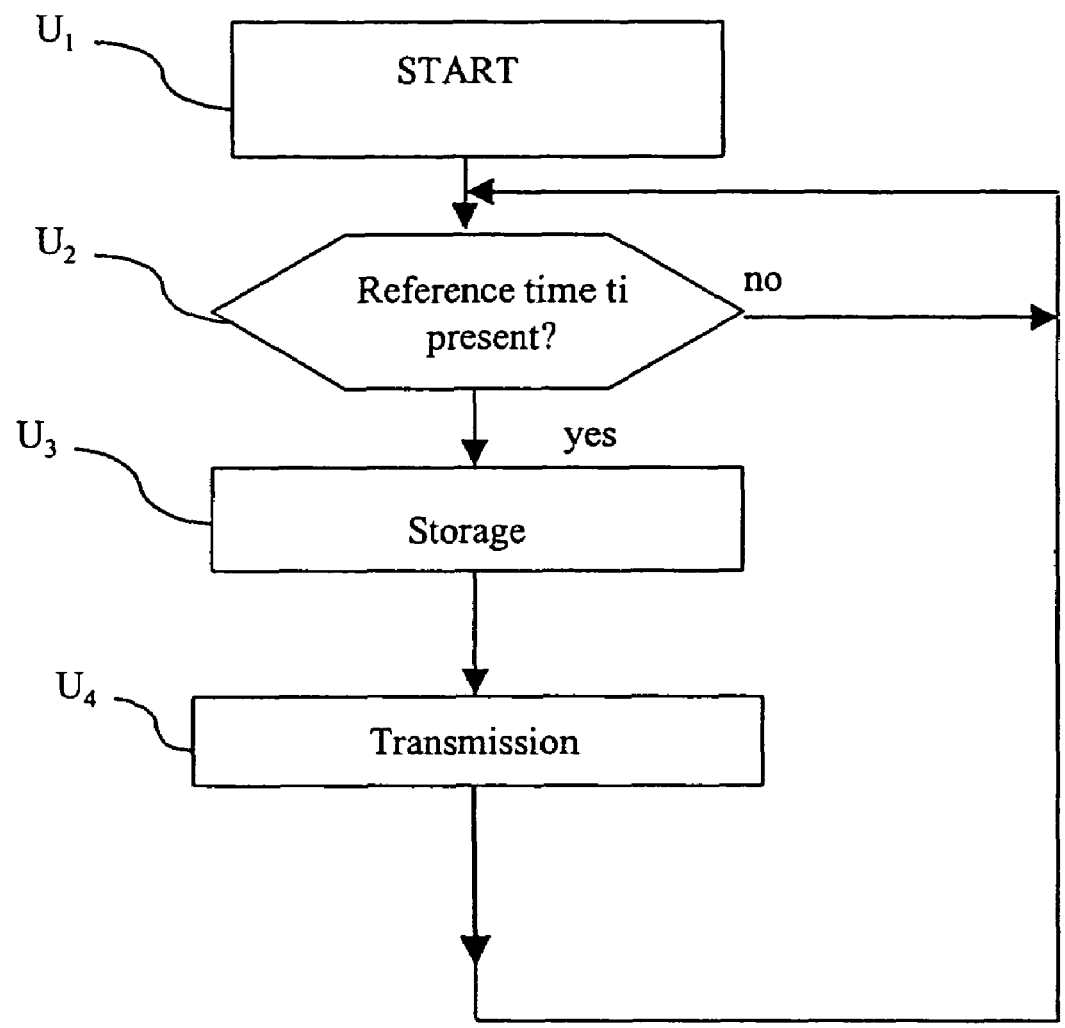
FIG. 12 depicts an algorithm of the synchronization method according to a fourth embodiment of the invention, implemented at the node A of FIG. 11.

The algorithm corresponding to this computer program is depicted in FIG. 12.

In addition, the node B has a temporary storage means denoted 98 including the registers 98a to 98e and a permanent storage means ROM denoted 100 and which includes a register 100a.

This storage means 100 also contains the different instructions of the computer program making it possible to implement the method according to the fourth embodiment at the receiver (node B).

Figure 13:
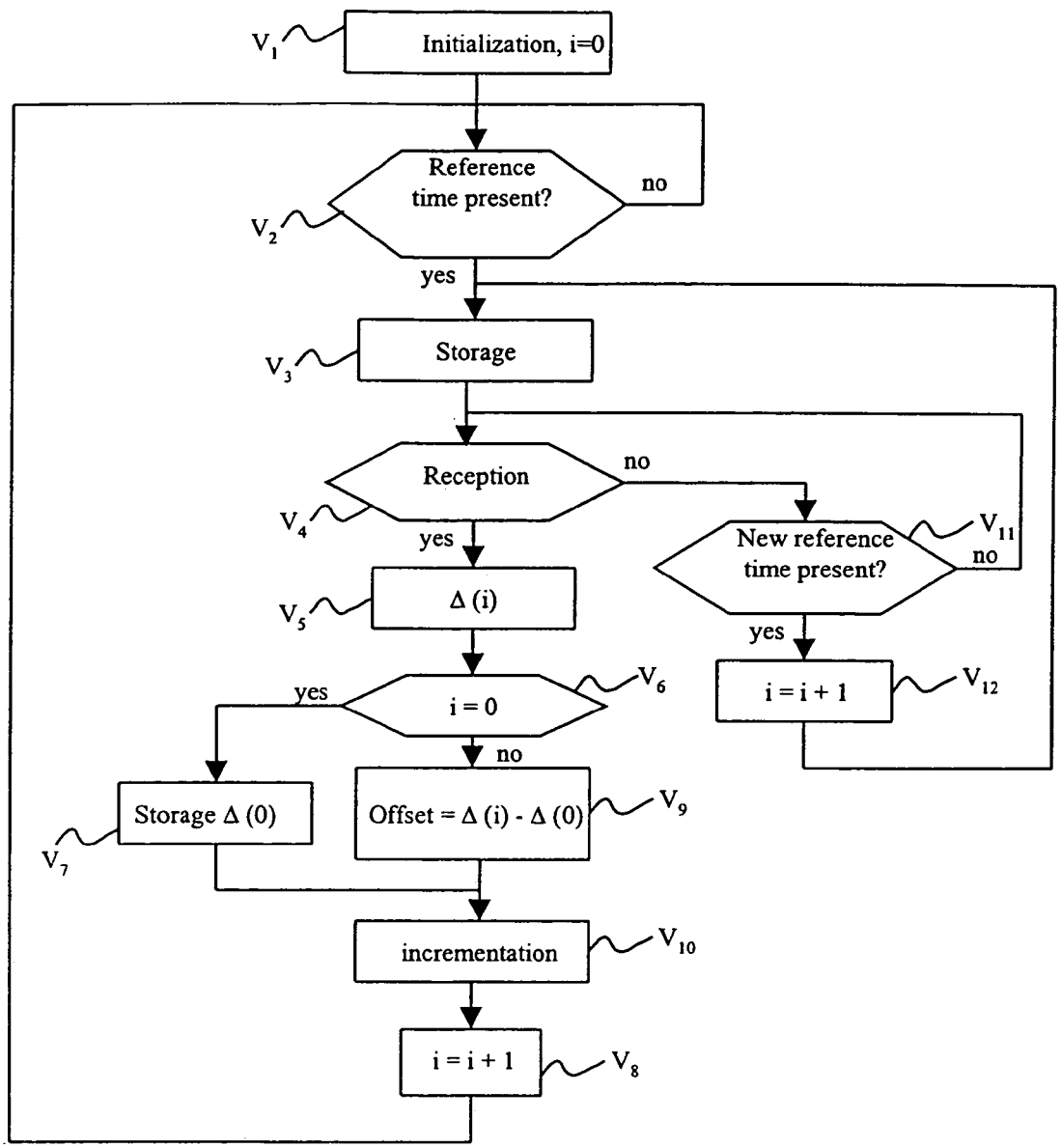
FIG. 13 is an algorithm of the synchronization method according to a fourth embodiment of the invention, implemented at the node B of FIG. 11.

The algorithm corresponding to this computer program is depicted in FIG. 13.

As indicated above, each of the nodes A and B has a 1394 physical interface circuit, a circuit fulfilling the functions of the 1394 connecting layer, a calculation unit, a radio modem connected to a radio unit which is equipped with a radio antenna, and a local bus connecting together the various elements of said node.

The method according to a fourth embodiment of the invention will now be described with reference to FIGS. 11 to 13.

At the device 18 of the node A, as depicted in FIG. 11, a counter is incremented continuously with the internal oscillator or clock CLK1.

Everything stated previously with reference to FIGS. 8. to 10, concerning notably the reference times, the reference events and the reference values, remains valid for this second embodiment.

The reference times are determined in the same way as indicated above with reference to FIG. 8.

Thus, after the step U, (FIG. 12), each time a reference time is determined at the node A (step U2), the reference time being denoted tA, the content of the counter in the 1394 physical interface circuit 18 is saved in the register 94a of the temporary storage means 94.

To each given reference time there corresponds a given reference value which represents said reference time and which is for example equal to a number of clock pulses N emitted by the clock or internal oscillator CLK1.

After storage of the reference value contained in the counter in the register 94a (step U3), the method includes a step of transmitting a data frame containing the reference value stored in this register (step U4) and the transmitting node A then awaits a new reference time tA' (step U2).

In a similar fashion to that which was described with reference to FIG. 8, the transmission step is made by the radio equipment consisting of the elements 28, 30 and 32 of node A, whilst the reception step at node B uses the elements 46, 48 and 50 of said node B.

In the device 36 of node B, a counter 104 is incremented continuously with the clock signal H2 issuing from the internal oscillator or clock CLK2.

After the step V, of FIG. 13 of initialising the variable i to the value 0, each time a reference time, and more particularly the start of a frame, is determined (step V2) as indicated above, a reference value representing this reference time is stored in the register 98a (step V3) of the temporary storage means 98 of FIG. 11.

The method according to the invention implemented at the receiver (node B) makes provision, in accordance with step V4 (FIG. 13), for an operation of verifying the reception of the content of the register 94a by the node B, or in other words, the content of register 94a transmitted by the radio frame.

On the assumption that the node B receives the content of this register 94a, then step V4 is followed by a step V5 during which the difference 0(i) between the reference values or number of clock pulses contained in the received frame is formed.

This difference constitutes an item of information representing the difference between the reference times tA identifying the start of transmission of the frame i at the node A and the reference time tB identifying the start of reception of the frame i at the node B.

This information constitutes an item of information within the meaning of the invention.

This first item of information represents a shift between the clocks CLK1 and CLK2 which is saved in the register 98b of the temporary storage means 98.

If no shift has been calculated before, the variable i is then equal to zero (step Vs) and this shift constitutes a reference shift denoted A(0), which will be used subsequently, at the time of determination of the correction necessary for synchronizing the clocks with each other.

In accordance with step V, of the method (FIG. 13), the shift 0(0) is stored in the register 98c of the temporary storage means 98.

Step V, is then followed by step V8, during which the variable i is incremented and the receiving node B awaits a new reference time in accordance with step V2.

Conversely, if i is different from 0, then the shift which has just been calculated 0(i) is compared with the reference shift A(0) (step V9).

In accordance with this case, the difference 0(0) (N($t_B$)−N($t_A$)) constitutes a first item of information within the meaning of the invention and the difference 0(i) ((N(tB('))−N(tAM)) constitutes a second item of information.

The comparison between the first and second items of information makes it possible to detect any deviation between the internal oscillators or clocks CLK1 and CLK2.

This difference between the first and second items of information supplies the number of deviation clock pulses between the internal osciilatore or clocks CLK1 and CLK2 between the two reference times.

This value of the deviation is then transferred to the value contained in the register 98d (step V,o) of the temporary storage means 98.

This register contains the total of the deviations measured previously between the two clocks CLK1 and CLK2.

The content of the register 98d represents the correction which is to be made to the clock signal H2 in order to be synchronized with respect to the clock signal H1.

Step V,o is then followed by step V8, during which the variable i is incremented and, in accordance with what has already been stated above, the receiver (node B) awaits a new reference time (step V2).

Returning to step V4, if the test carried out during this step shows that the node B has not received the content of the register 94a, this means for example that the corresponding data frame denoted i is lost or incorrectly received.

In this case, the receiver (node B) awaits the following reference time (steps V, and V2) in order to store a new reference value corresponding to the following reference time (step V3).

It will be noted that FIG. 7 supplies a table indicating, for different data frames i transmitted from node A to node B, with i=0, 1, ..., 7, ..., the different reference times tA, to (tA(oy, tB(°)), tA', tB', ..., Q'), tB (7), ... and the reference periods considered with respect to the given reference times.

Advantageously, in this fourth embodiment of the invention, the loss of a data frame or the fact that the latter is incorrectly received does not prevent, as is the case with the third embodiment, the detection of the deviation between the clocks CLK1 and CLK2.

This is because the table in FIG. 7 indicates that the reference periods are considered, for frames i=0 and i=1, between the reference times tA and tA' (node A), tB and tB' (node B), for frames i=1 and i=2, between the reference times tA' and tA" (node A), tB' and tB" (node B).

Moreover, the invention makes it possible to check the synchronization between the clocks of nodes A and B even if the data frames have variable duration.

It should be noted that, with regard to the optimisation of the size of the different registers and notably the registers 98a, 98b, 98d, everything stated during the description of the first embodiment remains valid for this second embodiment.

Notably, the optimisation of the size of these registers and particularly of the register 94a is important since it defines the bandwidth necessary for the radio transmission.

It should be noted that the present invention makes it possible to check the synchronization of several nodes connected to different serial connection buses with respect to a "Master" node where the latter is capable of broadcasting information to the nodes to be synchronized.

This applies more particularly when the nodes communicate with each other by radio or optical link.

It should also be noted that, in a communication network according to the invention, it is possible to provide for a network node which is dedicated to generating a reference event common to all the nodes. The existence of this node makes it possible to use the invention when the two nodes to be synchronized cannot generate reference events by themselves.

The invention claimed is:

1. A method of checking clock synchronization between a first node and a second node communicating with each other through frames, the two nodes detecting a plurality a common reference events and each node having a clock and a counter that counts the number of clock pulses, the method comprising the steps of:
   calculating a first item of information representing a difference between the number of clock pulses counted by the clock of the first node and the number of clock pulses counted by the clock of the second node at the appearance of a first reference event from among the plurality of common reference events between the first and second nodes;
   calculating a second item of information representing a difference between the number of clock pulses counted by the clock of the first node and the number of clock pulses counted by the clock of the second node at the appearance of a second reference event from among the plurality of common reference events between the first and second nodes; and comparing the first and second items of information with one another so as to check the clock synchronization between the two nodes.

2. A method of synchronization between two nodes, comprising the steps of:

performing the method of checking clock synchronization according to claim 1; and synchronizing the second node with respect to the first node based on the result of the comparing step, wherein said result corresponds to a deviation that is equal to a difference between the two items of information.

3. The method according to claim 1, wherein the step of calculating the first item of information comprises the steps of:

reading first information representing the number of clock pulses counted by the clock of the first node at a start of a first frame, wherein the start of the first frame represents the first reference event;

transmitting the first frame and said first information from the first node to the second node, said first information being inserted in said first frame;

reading second information representing the number of clock pulses counted by the clock of the second node at a start of the first frame containing said first information; and calculating the difference between said first and second information.

4. The method according to claim 3, wherein the step of calculating the second item of information comprises the steps of:

reading third information representing the number of clock pulses counted by the clock of the first node at a start of a second frame, wherein the start of the second frame represents the second reference event;

transmitting the second frame and said third information from the first node to the second node, said third information being inserted in said second frame;

reading fourth information representing the number of clock pulses counted by the clock of the second node at the start of the second frame containing said third information; and calculating the difference between said third and fourth information.

5. A system for checking clock synchronization between a first node and a second node communicating with each other through frames, the two nodes detecting a plurality of common reference events and each node having a clock and a counter that counts the number of clock pulses, the system comprising:

means for calculating a first item of information representing a difference between the number of clock pulses counted by the clock of the first node and the number of clock pulses counted by the clock of the second node at the appearance of a first reference event from among the plurality of common reference events between the first and second nodes;

means for calculating a second item of information representing a difference between the number of clock pulses counted by the clock of the first node and the number of clock pulses counted by the clock of the second node at the appearance of a second reference event from among the plurality of common reference events between the first and second nodes; and means for comparing the first and second items of information with one another so as to check the clock synchronization between the two nodes.

6. A system for synchronization between two nodes, comprising:

the system for checking clock synchronization according to claim 5; and means for synchronizing the second node with respect to the first node based on a result of the comparison means, wherein said result corresponds to a deviation that is equal to a difference between the two items of information.

7. The system according to claim 6, wherein the means for calculating the first item of information comprises:

means for reading first information representing the number of clock pulses counted by the clock of the first node at a start of a first frame, wherein the start of the frame represents the first reference event;

means for transmitting the first frame and said first information from the first node to the second node, said first information being inserted in said first frame;

means for reading second information representing the number of clock pulses counted by the clock of the second node at the start of the first frame containing said first information; and means for calculating a difference between said first and second information.

8. The system according to claim 7, wherein the means for calculating the second item of information comprises:

means for reading third information representing the number of clock pulses counted by the clock of the first node at a start of a second frame, wherein the start of the second frame represents the second reference event;

means for transmitting the second frame and said third information from the first node the second node, said third information being inserted in said second frame;

means for reading fourth information representing the number of clock pulses counted by the clock of the second node at the start of the second frame containing said third information; and means for calculating a difference between said third and fourth information.

9. A computer-executable program stored on a computer-readable storage medium, the program executing a method for checking clock synchronization between a first node and a second node communicating with each other through frames, the two nodes detecting a plurality of common reference events and each node having a clock and a counter that counts the number of clock pulses, the program comprising the steps of:

calculating a first item of information representing a difference between the number a clock pulses counted by the clock of the first node and the number of clock pulses counted by the clock of the second node at the appearance of a first reference event from among the plurality of common reference events between the first and second nodes;

calculating a second item of information representing a difference between the number of clock pulses counted by the clock of the first node and the number of clock pulses counted by the clock of the second node at the appearance of a second reference event from among the plurality of common reference events between the first and second nodes; and comparing the first and second items of information with one another so as to check the clock synchronization between the two nodes.

* * * * *

UNITED STATES PATENT AND TRADEMARK OFFICE
CERTIFICATE OF CORRECTION

PATENT NO. : 7,260,653 B2  
APPLICATION NO. : 11/154680  
DATED : August 21, 2007  
INVENTOR(S) : Le Scolan et al.

It is certified that error appears in the above-identified patent and that said Letters Patent is hereby corrected as shown below:

TITLE PAGE ITEM 57:
    Abstract, Line 5, "counter" should read --counter; --; and  
    Abstract, Line 12, "pulse" should read -- pulses --.

COLUMN 1:
    Line 21, "equipments" should read -- equipment --; and  
    Line 29, "(24,576)" should read -- (24.576) --.

COLUMN 7:
    Line 8, "no" should read -- so no --; and  
    Line 9, "it contributes to provide" should read -- contributing to providing --.

COLUMN 11:
    Line 18, "bus be" should read -- bus $b_b$ --.

COLUMN 13:
    Line 46, "of" should read -- to --;  
    Line 55, "259" should read -- 258 --; and  
    Line 58, "$t'_A$" (second occurrence) should read -- $t_A$ --.

COLUMN 14:
    Line 54, "$t'_B$" (second occurrence) should read -- $t_B$. --.

COLUMN 15:
    Line 17, "$t'_e$" should read -- $t'_b$ --; and  
    Line 30, "2488." should read -- 248c --.

COLUMN 17:
    Line 39, "$N(tB)-N(t_A)-N(t'_B)-N(t'_A))$." should read  
-- $N(t_B)- N(t_A)-N(t'_B) - N(t'_A))$. --; and  
    Line 59, "be." should read -- $b_B$. --.

UNITED STATES PATENT AND TRADEMARK OFFICE
CERTIFICATE OF CORRECTION

PATENT NO. : 7,260,653 B2
APPLICATION NO. : 11/154680
DATED : August 21, 2007
INVENTOR(S) : Le Scolan et al.

It is certified that error appears in the above-identified patent and that said Letters Patent is hereby corrected as shown below:

COLUMN 18:
Lines 37-38, "$N(t"e)-N(t"q)$ and $N(tB(4))-NN(4))$." should read -- $N(t"_B) - N(t"_A)$ and $N(t_B^{(4)}) - N(t_A^{(4)})$ --; and
Line 42, "Q3) well" should read -- Q3 will --;
Line 56, "$N(fA)-N(t_A)$" should read -- $N(t'_A) - N(t_A)$ --; and
Line 65, "$N(t'_B)-N(t'_A)-(N(tB)-N(t_A))$" should read -- $N(t'_B)-N(t'_A)-(N(t_B)-N(t_A))$ --.

COLUMN 26:
Line 52, "plurality a" should read -- plurality of --.

COLUMN 28:
Line 49, "a" should read -- of --.

Signed and Sealed this

Twenty-ninth Day of July, 2008

JON W. DUDAS
*Director of the United States Patent and Trademark Office*